US008553065B2

(12) United States Patent
Gannu et al.

(10) Patent No.: US 8,553,065 B2
(45) Date of Patent: Oct. 8, 2013

(54) SYSTEM AND METHOD FOR PROVIDING AUGMENTED DATA IN A NETWORK ENVIRONMENT

(75) Inventors: Satish K. Gannu, San Jose, CA (US); Leon A. Frazier, Cary, NC (US); Didier R. Moretti, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 239 days.

(21) Appl. No.: 13/088,974

(22) Filed: Apr. 18, 2011

(65) Prior Publication Data
US 2012/0262533 A1 Oct. 18, 2012

(51) Int. Cl.
*H04N 7/15* (2006.01)

(52) U.S. Cl.
CPC ....................................... *H04N 7/15* (2013.01)
USPC .................. 348/14.07; 348/14.08; 348/14.09; 704/251

(58) Field of Classification Search
CPC ........... H04N 7/15; G10L 15/26; G10L 75/04
USPC ...................... 348/14.01–14.16; 704/251, 235
See application file for complete search history.

(56) References Cited

U.S. PATENT DOCUMENTS

| 5,613,032 | A | 3/1997 | Cruz et al. |
| 5,677,901 | A | 10/1997 | Iwamura |
| 5,857,179 | A | 1/1999 | Vaithyanathan et al. |
| 5,961,582 | A | 10/1999 | Gaines |
| 6,012,053 | A | 1/2000 | Pant et al. |
| 6,026,388 | A | 2/2000 | Liddy et al. |
| 6,301,586 | B1 | 10/2001 | Yang et al. |
| 6,304,283 | B1 | 10/2001 | Kitagawa |
| 6,345,253 | B1 | 2/2002 | Viswanathan |
| 6,697,793 | B2 | 2/2004 | McGreevy |
| 7,017,183 | B1 | 3/2006 | Frey et al. |
| 7,072,837 | B2 | 7/2006 | Kemble et al. |
| 7,099,867 | B2 | 8/2006 | Okada et al. |
| 7,260,312 | B2 | 8/2007 | Srinivasan et al. |

(Continued)

FOREIGN PATENT DOCUMENTS

| CN | 102648464 A | 8/2012 |
| EP | 2483803 | 4/2011 |

(Continued)

OTHER PUBLICATIONS

Seher, Indra, "Query Expansion in Personal Queries," IADIAS (International Association for Development of the Information Society) 2006, 5 pages www.iadis.org/Multi2006/papers/16/5023_ISA.

(Continued)

*Primary Examiner* — Melur Ramakrishnaiah
(74) *Attorney, Agent, or Firm* — Patent Capital Group

(57) ABSTRACT

A method is provided in one example and includes identifying a particular word recited by an active speaker in a conference involving a plurality of endpoints in a network environment; evaluating a profile associated with the active speaker in order to identify contextual information associated with the particular word; and providing augmented data associated with the particular word to at least some of the plurality of endpoints. In more specific examples, the active speaker is identified using a facial detection protocol, or a speech recognition protocol. Data from the active speaker can be converted from speech to text.

20 Claims, 8 Drawing Sheets

(56) References Cited

U.S. PATENT DOCUMENTS

| | | | |
|---|---|---|---|
| 7,292,532 B2 | 11/2007 | Sakata et al. | |
| 7,350,227 B2 | 3/2008 | McGrew et al. | |
| 7,417,959 B2 | 8/2008 | Dorner et al. | |
| 7,457,808 B2 | 11/2008 | Gaussier et al. | |
| 7,493,369 B2 | 2/2009 | Horvitz et al. | |
| 7,509,491 B1 | 3/2009 | Wainner et al. | |
| 7,698,442 B1 | 4/2010 | Krishnamurthy et al. | |
| 7,706,265 B2 | 4/2010 | Monette et al. | |
| 7,809,714 B1 | 10/2010 | Smith | |
| 7,818,215 B2 | 10/2010 | King et al. | |
| 7,827,191 B2 | 11/2010 | Williams | |
| 7,853,553 B2 | 12/2010 | Lankinen et al. | |
| 7,913,176 B1 | 3/2011 | Blattner et al. | |
| 8,015,250 B2 | 9/2011 | Kay | |
| 8,051,204 B2 | 11/2011 | Kai et al. | |
| 8,214,209 B2 | 7/2012 | Nagatomo | |
| 8,260,774 B1 | 9/2012 | Aggarwal | |
| 2002/0032772 A1 | 3/2002 | Olstad et al. | |
| 2002/0035605 A1 | 3/2002 | McDowell et al. | |
| 2003/0014448 A1 | 1/2003 | Castellanos et al. | |
| 2003/0014586 A1 | 1/2003 | Mitsuda et al. | |
| 2003/0028773 A1 | 2/2003 | McGarvey et al. | |
| 2003/0028896 A1 | 2/2003 | Swart et al. | |
| 2003/0033288 A1 | 2/2003 | Shanahan et al. | |
| 2003/0093789 A1 | 5/2003 | Zimmerman et al. | |
| 2004/0158609 A1 | 8/2004 | Daniell et al. | |
| 2004/0193426 A1 | 9/2004 | Maddux et al. | |
| 2004/0208123 A1 | 10/2004 | Sakata et al. | |
| 2004/0258396 A1 | 12/2004 | Nakamura et al. | |
| 2005/0060283 A1 | 3/2005 | Petras et al. | |
| 2005/0068167 A1 | 3/2005 | Boyer et al. | |
| 2005/0102522 A1 | 5/2005 | Kanda | |
| 2005/0108001 A1 | 5/2005 | Aarskog | |
| 2005/0160166 A1 | 7/2005 | Kraenzel | |
| 2006/0150253 A1 | 7/2006 | Feuerstein et al. | |
| 2007/0016583 A1 | 1/2007 | Lempel et al. | |
| 2007/0118275 A1 | 5/2007 | Qi et al. | |
| 2007/0198725 A1 | 8/2007 | Morris | |
| 2007/0239837 A1 | 10/2007 | Jablokov et al. | |
| 2007/0244892 A1 | 10/2007 | Narancic | |
| 2007/0260684 A1* | 11/2007 | Sharma et al. | 709/204 |
| 2007/0266020 A1 | 11/2007 | Case et al. | |
| 2007/0294265 A1 | 12/2007 | Askew et al. | |
| 2008/0027981 A1 | 1/2008 | Wahl | |
| 2008/0060055 A1 | 3/2008 | Lau | |
| 2008/0065892 A1 | 3/2008 | Bailey et al. | |
| 2008/0077791 A1 | 3/2008 | Lund et al. | |
| 2008/0091670 A1 | 4/2008 | Ismalon | |
| 2008/0097985 A1 | 4/2008 | Olstad et al. | |
| 2008/0126690 A1 | 5/2008 | Rajan et al. | |
| 2008/0140674 A1 | 6/2008 | Ishikawa | |
| 2008/0154873 A1 | 6/2008 | Redlich et al. | |
| 2008/0184326 A1* | 7/2008 | Nakajima | 725/133 |
| 2008/0222142 A1 | 9/2008 | O'Donnell | |
| 2008/0244740 A1 | 10/2008 | Hicks et al. | |
| 2008/0295040 A1* | 11/2008 | Crinon | 715/865 |
| 2009/0006333 A1 | 1/2009 | Jones et al. | |
| 2009/0049053 A1 | 2/2009 | Barker et al. | |
| 2009/0055175 A1 | 2/2009 | Terrell et al. | |
| 2009/0182727 A1 | 7/2009 | Majko | |
| 2009/0196570 A1 | 8/2009 | Dudas et al. | |
| 2009/0226870 A1 | 9/2009 | Minotti | |
| 2009/0254572 A1 | 10/2009 | Redlich et al. | |
| 2009/0276377 A1 | 11/2009 | Dutta et al. | |
| 2009/0293016 A1 | 11/2009 | Potevin et al. | |
| 2009/0319365 A1 | 12/2009 | Waggoner et al. | |
| 2009/0327271 A1 | 12/2009 | Amitay et al. | |
| 2010/0010968 A1 | 1/2010 | Redlich et al. | |
| 2010/0057815 A1 | 3/2010 | Spivack et al. | |
| 2010/0153855 A1 | 6/2010 | Roberts et al. | |
| 2010/0179801 A1 | 7/2010 | Huynh et al. | |
| 2010/0223581 A1 | 9/2010 | Manolescu et al. | |
| 2010/0223629 A1 | 9/2010 | Appelbaum et al. | |
| 2010/0250547 A1 | 9/2010 | Grefenstette et al. | |
| 2010/0274815 A1 | 10/2010 | Vanasco | |
| 2010/0280985 A1 | 11/2010 | Duchon et al. | |
| 2010/0306816 A1 | 12/2010 | McGrew et al. | |
| 2011/0077936 A1 | 3/2011 | Arumugam et al. | |
| 2011/0078167 A1 | 3/2011 | Sundaresan et al. | |
| 2011/0099195 A1 | 4/2011 | Patwardhan et al. | |
| 2011/0119264 A1 | 5/2011 | Hu et al. | |
| 2011/0161409 A1 | 6/2011 | Nair et al. | |
| 2011/0173260 A1 | 7/2011 | Biehl et al. | |
| 2011/0208522 A1 | 8/2011 | Pereg et al. | |
| 2011/0225048 A1 | 9/2011 | Nair | |
| 2011/0231296 A1 | 9/2011 | Gross et al. | |
| 2011/0252330 A1 | 10/2011 | Catlin et al. | |
| 2011/0270709 A1 | 11/2011 | Lewis et al. | |
| 2011/0304685 A1 | 12/2011 | Khedouri et al. | |
| 2012/0002544 A1 | 1/2012 | Kokku et al. | |
| 2012/0030232 A1 | 2/2012 | John et al. | |
| 2012/0046936 A1 | 2/2012 | Kandekar et al. | |
| 2012/0081506 A1* | 4/2012 | Marvit | 348/14.12 |
| 2012/0102050 A1 | 4/2012 | Button et al. | |
| 2012/0110087 A1 | 5/2012 | Culver et al. | |
| 2012/0185239 A1 | 7/2012 | Goud et al. | |

FOREIGN PATENT DOCUMENTS

| | | |
|---|---|---|
| WO | WO02/42864 | 5/2002 |
| WO | WO02/42940 | 5/2002 |
| WO | WO2011/041443 | 4/2011 |
| WO | WO2012/173780 | 12/2012 |

OTHER PUBLICATIONS

Jiang, Weiliang, et al., "A Method for Personal Query Based on Role Preference Ontology," Industrial Mechanatronics and Automation, ICIMA 2009 International Conference, pp. 479-481; Abstract Only, 1 page.

U.S. Appl. No. 13/160,701, filed Jun. 15, 2011 entitled "System and Method for Discovering Videos," Inventor(s) Ashutosh A. Malegaonkar, et al.

U.S. Appl. No. 13/149,405, filed May 31, 2011 entitled "System and Method for Evaluating Results of a Search Query in a Network Environment," Inventor(s): Satish K. Gannu, et al.

Billi, R., et al., "Interactive Voice Technology at Work: The CSELT Experience," 2nd IEEE Workshop on Interative Voice Technology for Telecommunications Applications (IVTTA94); Sep. 26-27, 1994; pp. 43-48; http://ieeexplore.ieee.org/stamp/stamp.jsp?arnumber=00341547.

Carnegie Mellon University, "Speech at CMU," 4 pages; printed Sep. 30, 2009; http://www.speech.cs.cmu.edu/speech/.

Caslon Analytics Echelon Note: Overview, May 2006, 6 pages; printed Sep. 30, 2009 http://www.caslon.com.au/echelonnote.htm.

Grimes, Seth, "Sentiment Analysis: Opportunities and Challenges," Beye Network; Jan. 22, 2008; 6 pages, http://www.b-eye-network.com/view/6744.

Hess, Andreas, et al., "From Web 2.0 to Semantic Web: A Semi-Automated Approach," 15 pages; printed Sep. 30, 2009; http://www.andreas-hess.info/publications/hess-cisweb08.pdf.

iLogos v1.5 downlod (win); 4 pages. [Retrieved and printed on May 28, 2010] from http://www.phil.cmu.edu/projects/argument_mapping/.

Jadhav, N.S. and I.N. Dwivedi, "Social computing based personal vocabulary building," 5 pages; printed Sep. 30, 2009; http://www.priorartdatabase.com/IPCOM/000173550/.

Maybury, Mark et al., "Enterprise Expert and Knowledge Discovery," MITRE Technical Papers, The MITRE Corporation, Sep. 2000, 11 pages; http://www.mitre.org/work/tech_papers/tech_papers_00/maybury_enterprise/maybury_enterprise.pdf.

U.S. Appl. No. 13/608,787, filed Sep. 10, 2012 entitled "System and Method for Enhancing Metadata in a Video Processing Environment," Inventor(s) Sandikumar V. Shah, et al.

"Click Scoring Relevance Framework," LucidWorks, 7 pages [retrieved and printed May 7, 2012] http://lucidworks.lucidimagination.com/display/lweug/Click+Scoring+Relevance+Framework.

"Google Custom Search," Web Page, Google.com, © 2012 Google, 1 page http://www.google.com/cse/.

(56) References Cited

OTHER PUBLICATIONS

"Recommender System," Wikipedia, Apr. 28, 2012; 9 pages http://en.wikipedia.org/wiki/Recommender_system.

"Understanding Metadata," NISO Press, National Information Standards Organization, 2004, 20 pages.

Dang, et al., "Learning to Rank Query Reformulations," Proceedings of the 33rd Annual International ACM SIGIR Conference, SIGIR'10, Jul. 19-23, 2010, Geneva, Switzerland (2010); 2 pages.

Filippova, et al., Improved Video Categorization from Text Metadata and User Comments, Proceedings of the 34th Annual International ACM SIGIR Conference, SIGIR'11, Jul. 24-28, 2011, Beijing, China (2011); 8 pages.

Gligorov, User-generated Metadata in Audio-visual Collections, Proceedings of the International World Wide Web Conference, WWW 2012, Apr. 16-20, 2012, Lyon, France (2012); 5 pages.

Harry, David, "The SEO Guide to Google Personalized Search," The Fire Horse Trail, SEO and Marketing Blog, Dec. 7, 2009, 9 pages http://www.huomah.com/Search-Engines/Search-Engine-Optimization/The-SEO-Guide-to-Google-Personalized-Search.html.

Jain, et al., "Learning to Re-Rank: Query-Dependent Image Re-Ranking Using Click Data," Proceedings of the International World Wide Web Conference, WWW 2011, Mar. 28-Apr. 1, 2011, Hyderabad, India (2011); 10 pages.

Li, Yingbo, et al., "Multi-Video Summarization Based on OB-MMR," EURECOM, Sophia Antipolis, France, Content-Based Multimedia Indexing (CBMI) 2011 9th International Workshop; 6 pages http://www.eurecom.fr/fr/publication/3365/download/mm-publi-3365.pdf.

Masnick, Mike, "Creating an Automatic Highlight Reel for Sporting Events (Bleeding Edge)," Tech Dirt lite, Aug. 20, 2003, 2 pages http://www.techdirt.com/article_lite.php?sid=20030820/0042248&pid=17.

Rodriguez, et al. Automatic Metadata Generation Using Associative Networks, ACM Transactions on Information Systems, vol. 27, No. 2, Article 7, Feb. 2009.

U.S. Appl. No. 12/471,404, filed Sep. 30, 2009, entitled "System and Method for Generating Personal Vocabulary from Network Data," Inventor(s): Satish K. Gannu, et al.

U.S. Appl. No. 12/571,414, filed Sep. 30, 2009, entitled "System and Method for Providing Speech Recognition Using Personal Vocabulary in a Network Environment," Inventor(s): Satish K. Gannu, et al.

U.S. Appl. No. 12/571,421, filed Sep. 30, 2009, entitled "System and Method for Ensuring Privacy While Tagging Information in a Network Environment," Inventor(s): Satish K. Gannu, et al.

U.S. Appl. No. 12/571,426, filed Sep. 30, 2009, entitled "System and Method for Controlling an Exchange of Information in a Network Environment," Inventor(s): Satish K. Gannu, et al.

U.S. Appl. No. 12/762,194, filed Apr. 16, 2010, entitled "System and Method for Deducing Presence Status from Network Data," Inventor(s): Thangavelu Arumugam, et al.

U.S. Appl. No. 12/778,89, filed May 12, 2010, entitled "System and Method for Deriving User Expertise Based on Data Propagating in a Network Environment," Inventor(s): Virgil N. Mihailovici, et al.

U.S. Appl. No. 12/971,852, filed Dec. 17, 2010, entitled "System and Method for Providing Argument Maps Based on Activity in a Network Environment," Inventor(s) Deepti Patil et al.

U.S. Appl. No. 12/971,946, filed Dec. 17, 2010, entitled "System and Method for Providing Feeds Based on Activity in a Network Environment," Inventor(s) Satish K. Gannu et al.

Hess, Andreas, et al., "Multi-Value Classification of Very Short Texts," 8 pages, printed on May 12, 2010 IDS; http://www.andreas-hess.info/publications/hess-ki08.pdf.

Horvitz, E., et al., "Coordinate: Probabilistic Forecasting of Presence and Availability," 2002, 10 pages; ftp://ftp.research.microsoft.com/pub/ejh/coordinate.pdf.

Kohl, J. and C. Neuman, The Kerberos Network Authentication Service (V5), Network Working Group, RFC 1510, 09.1993, 105 pages; http://www.ietf.org/rfc/rfc1510.

Lancope, "Stealth Watch," Revolutionize the Way You View Your Network, © 2009, 8 pages http://storage.pardot.com/2382/9637/StealthWatch_System_Family_Brochure.pdf.

Montgomery, W. A., et al., "Network Intelligence for Presence Enhanced Communication," SPIRITS Working Group, May 2002, 9 pages, http://ietfreport.isoc.org/all-ids/draft-montgomery-copeland-presence-spirits-00.txt.

Nortel Networks Wireless Solutions (A. Silver, J. Larkins, D. Stringer), "Unified Network Presence Management," A White Paper, © 2000, 6 pages, www.mobilein.com/UNPM.pdf.

U.S. Appl. No. 13/098,112, filed Apr. 29, 2011, entitled "System and Method for Evaluating Visual Worthiness of Video Data in a Network Environment," Inventor(s): Deepti Patil, et al.

U.S. Appl. No. 13/098,434, filed Apr. 30, 2011, entitled "System and Method for Media Intelligent Recording in a Network Environment,", Inventor(s): Ashutosh A. Malegaonkar, et al.

PCT Notification of Transmittal (1 page) of the International Search Report (3 pages), and Written Opinion of the International Searching Authority, or the Declaration (6 pages) mailed Jan. 12, 2011 for PCT/US2010/050762.

Chen, Hsinchun, et al., "A Concept Space Approach to Addressing the Vocabulary Problem in Scientific Information Retrieval: An Experiment on the Worm Community System," Journal of the American Socity for Information Science Wiley for Asis USA, vol. 48, No. 1, Jan. 1997, XP002614340, ISSN: 0002-8231; pp. 17-31.

Chen, Rung-Ching, et al., "Adding New Concepts on the Domain Ontology Based on Semantic Similarity," International Conference on Business and Information, Jul. 12-14, 2006, XP002614339; 14 pages; http://bai2006.atisr.org/CD/Papers/2006bai6169.pdf.

Sethy, Abhinav, et al., "Building Topic Specific Language Models from Webdata Using Competitive Models," $9^{th}$ European Conference on Speech Communication and Technology, Eurospeech Interspeech 2005 International Speech and Communication Association Fr., 2005, pp. 1293-1296; XP 002614341; http://sail.usc.edu/publications/sethy-euro2005.pdf.

"The LNTS Leap: Phoneme Recognition," 2 pages; printed Sep. 30, 2009; http://www.instech.com.

U.S. Appl. No. 13/182,862, filed Jul. 14, 2.011 entitled "System and Method for Deriving User Expertise Based on Data Propagating in a Network Environment," Inventor(s): Satish K. Gannu, at al.

Moorthi, Y. L. R., "Have Breakfast or Be Breakfast," Wall Street Journal, Feb. 8, 2010; 2 pages.; http://online.wsj.com/article/SB126465641868236415.html#printMode.

Nexidia, "Audio and Speech Analytics Software," 1 page; printed Sep. 30, 2009; http://www.nexidia.com.

NSA Watch, "Other Surveillance Network: Governmental Surveillance Agencies," 2 pages; printed Sep. 30, 2009; http://www.nsawatch.org/networks.html.

Ohl, Ricky, "Computer Supported Argument Visualisation: Modelling Wicked Problems," Ph. D. Thesis, Australian Digital Theses Program, Feb. 2008; 403 pgs.; http://gu.edu.au:8080/adt-root/public/adt-QGU20090724.155249/index. html.

Oliveira, Bruno et al., "Automatic Tag Suggestion Based on Resource Contents," Knowledge Engineering: Practice and Patterns, Lecture Notes in Computer Science, 2008, vol. 5268/2008, DOI: 10.1007/978-3-54 [Abstract Only, 1 page]; http://www.springerlink.com/content/008w50405265r177/.

Rosella Data Mining & Database Analytics, "Web Search and Web Navigation Pattern Analyzer," 3 pages; printed Jul. 25, 2011; http://222.roselladb.com/surf-pattern-analyzer.htm.

Smith, Ronnie W., "Performance Measures for the Next Generation of Spoken Natural Language Dialog Systems," pp. 37-40; http://acl.ldc.upenn.edu/W/W97/W97-0607.pdf.

Swabey, Pete, "Making the Invisible Visible," 2 pages; Sep. 23, 2009; http://www.trampolinesystems.com/news/in+the+news/archive/2009/59.

Trampoline Systems, "Navigation," 2 pages; printed Sep. 30, 2009; www.trampolinesystems.com.

Trant, Jennifer, "Studying Social Tagging and Folksonomy: A Review and Framework," Jan. 2009, 10(1) Journal of Digital Information; 42 pages http://dlist.sir.arizona.edu/arizona/handle/10150/105375.

(56) References Cited

OTHER PUBLICATIONS

Virage, "Audio Analysis," Autonomy Virage, © 2009 Autonomy Virage, 1 page http://www.virage.com/security-and-surveillance/functions/audio-analysis/index.htm.

Virage, "Understanding Video," Autonomy Virage, © 2009 Autonomy Virage, 5 pages http://www.virage.com/rich-media/technology/understanding-video/index.htm.

Wasilewska, Anita, CSE 34—Data Mining: Text Mining; 85 pages; www.cs.sunysb.edu/~cse634/presentations/TextMining.pdf.

WebChoir Products—Personal Vocabulary Tools, "Personal Tools," 1 page; printed Sep. 30, 2009; http://www,webchoir.com/products/ptt.html .

Wikipedia, "Homophone," 3 pages; printed Sep. 30, 2009; http://en.wikipedia.org/wiki/Homophone.

Wikipedia, "International Phonetic Alphabet," 19 pages; printed Sep. 30, 2009; http://en.wikipedia.org/wiki/International_Phonetic_Alphabet.

Wikipedia, "Phoneme," 7 pages; printed Sep. 30, 2009; http://en.wikipedia.org/wiki/Phoneme.

Bollen, et al., "Usage Derived Recommendations for a Video Digital Library," Journal of Network and Computer Applications, Academic Press, New York, NY, vol. 30, No. 3, Mar. 16, 2007.

EPO Nov. 7, 2012 Response to Communication pursuant to Rule 161(1) and 162 from European Application No. 10770664; 8 pages.

PCT Oct. 4, 2012 Notification of Transmittal of the International Search Report and Written Opinion of the International Search Authority from Application PCT/US2012/040097; 15 pages.

PCT Apr. 3, 2012 International Preliminary Report on Patentability and Wrtten Opinion of the International Searching Authority from International Application PCT/US2010/050762; 7 pages.

Shao, Jian, et al., "Multi-Video Summarization Using Complex Graph Clustering and Mining," Computer Science and Information Systems, vol. 7, No. 1 (2010); 14 pages http://www.doiserbia.nb.rs/img/doi/1820-0214/2010/1820-02141001085S.pdf.

Telestream, Inc. Product Literature, "Extracting and Preparing Metadata to Make Video Files Searchable," Telestream, Inc. 2008; 6 pages.

Tian, Ying-li, et al., "IBM Smart Surveillance System (S3): Event Based Video Surveillance System with an Open and Extensible Framework," Special Issue of Machine Vision and Applications Journal, 2008, vol. 19, Issue 5-6, 30 pages http://www.docstoc.com/docs/20141664/IBM-Smart-Surveillance-System-(S3)-Event-Based-Video-Surveillance.

Umbrich J., et al., "Four Heuristics to Guide Structured Content Crawling," Eighth International Conference on WEB Engineering, 2008, Jul. 14, 2008; © 2008 IEEE DOI 10.1109/ICWE.2008.42.

Wang, Feng, et al., "Multi-Document Video Summarization," ICME 2009, IEEE International Conference on Multimedia and Expo, 4 pages http://www.eurecom.fr/fr/publication/2751/download/mm-publi-2751.pdf.

Yuen, L., et al., "Excalibur: A Personalized Meta Search Engine," Computer Software and Applications Conference 2004, COMPSAC 2004 Proceedings of the 28th Annual International, 2 pages.

U.S. Appl. No. 13/364,102, filed Feb. 1, 2012 entitled "System and Method for Creating Customized On-Demand Video Reports in a Network Environment," Inventor(s): Deepti Patil, et al.

Lacher, Martin S., et al., "On the Integration of Topic Maps and RDF Data," Extreme Markup Languages 2001, 14 pages.

Wang, Xuerui, et al., "Topics over Time: A NonMarkov Continuous Time Model of Topical Trends," KDD'06, Aug. 20-23, 2006, 10 pages.

\* cited by examiner

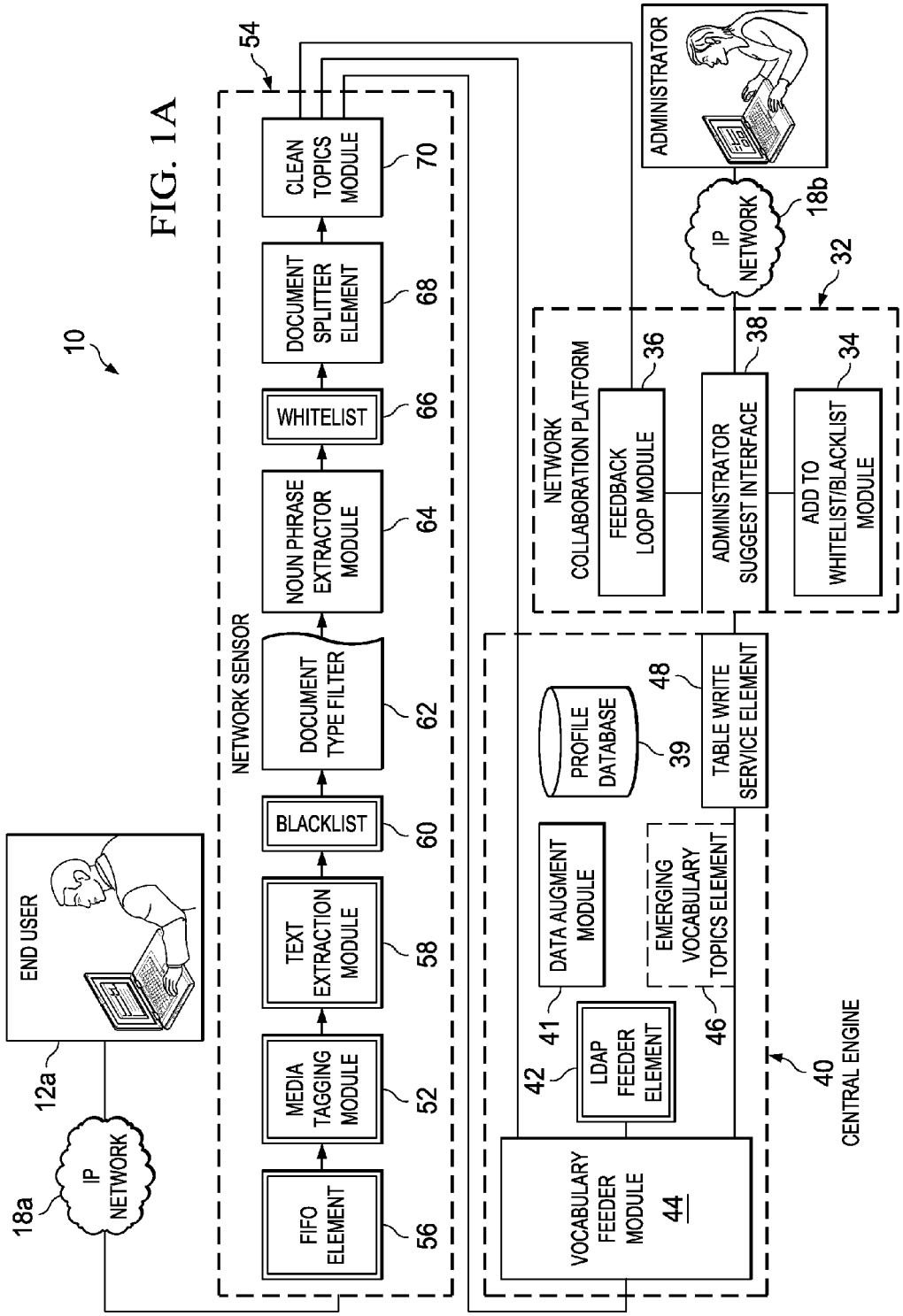

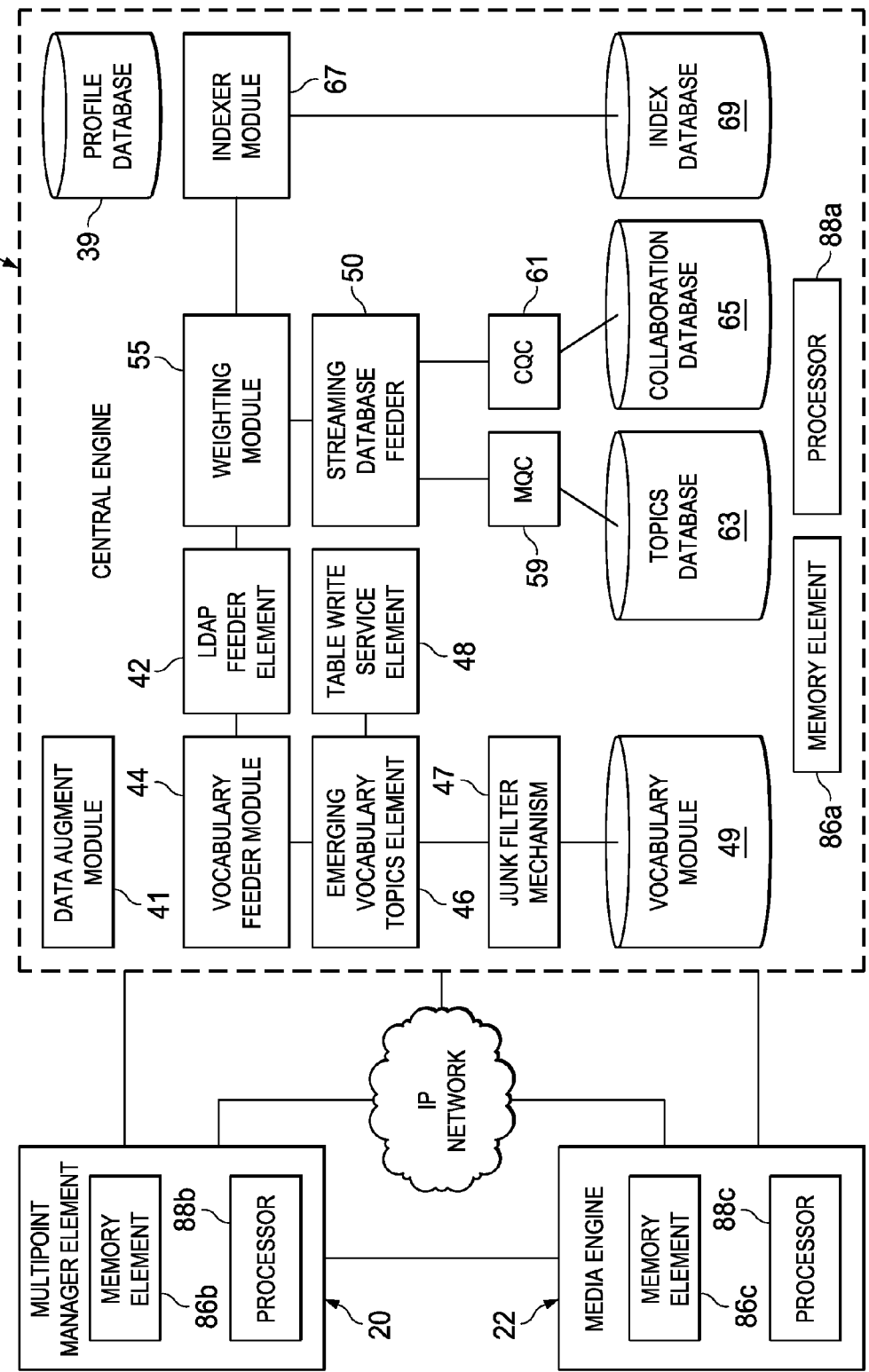

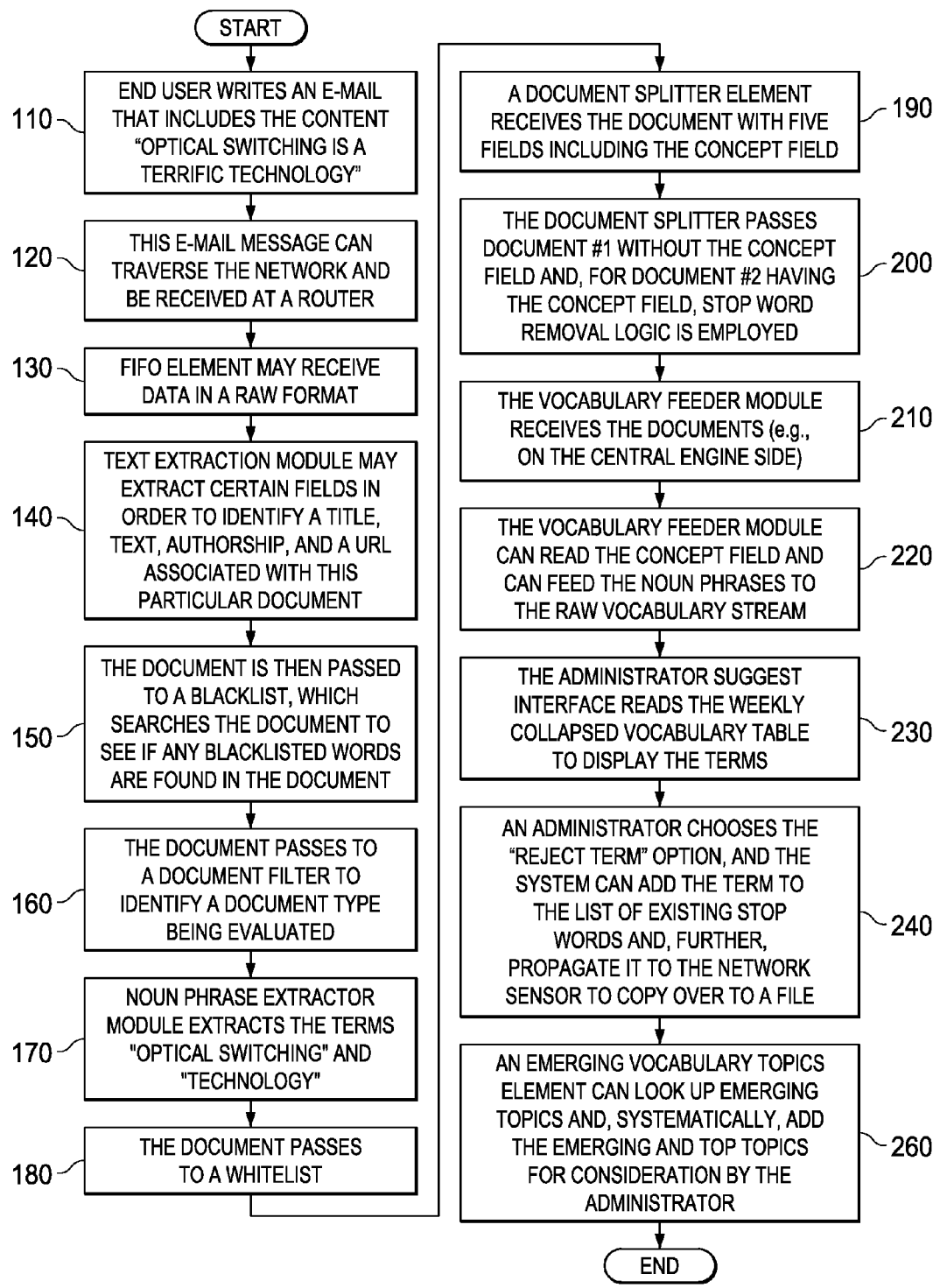

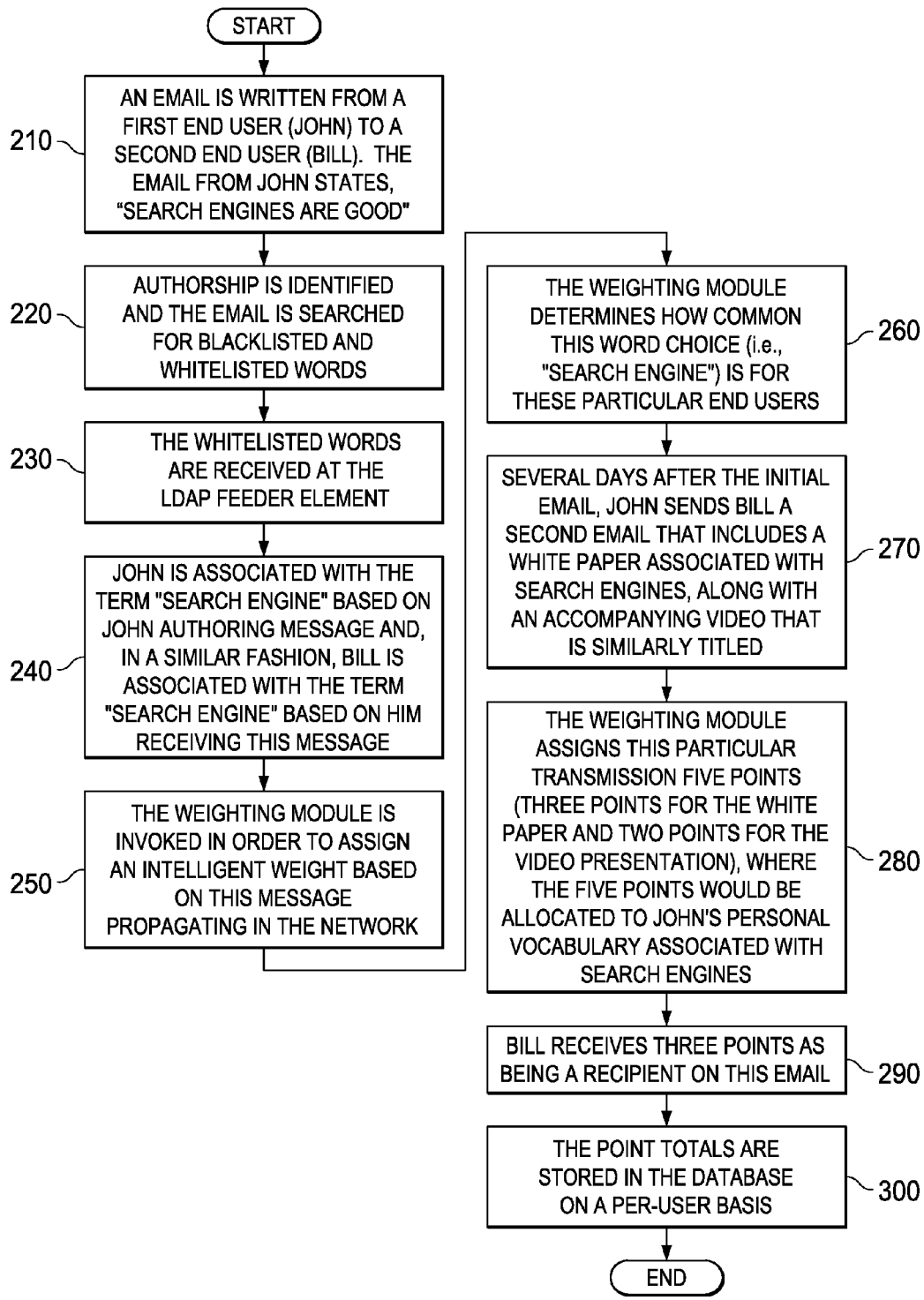

SYSTEM AND METHOD FOR PROVIDING AUGMENTED DATA IN A NETWORK ENVIRONMENT

TECHNICAL FIELD

This disclosure relates in general to the field of communications and, more particularly, to providing augmented data in a network environment.

BACKGROUND

The field of communications has become increasingly important in today's society. In particular, the ability to effectively gather, associate, and organize information presents a significant obstacle for component manufacturers, system designers, and network operators. As new communication platforms and technologies become available, new protocols should be developed in order to optimize the use of these emerging protocols. Some issues have arisen in data exchange scenarios in which video conferencing platforms and audio conferencing platforms are deployed.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1A is a simplified block diagram of a communication system for providing augmented data in a network environment in accordance with one embodiment of the present disclosure;

FIG. 2 is a simplified block diagram of a central engine in the communication system in accordance with one embodiment;

FIG. 3 is a simplified flowchart illustrating a series of example operations associated with the communication system; and FIG. 4 is a simplified flowchart illustrating another series of example operations associated with the communication system.

DETAILED DESCRIPTION OF EXAMPLE EMBODIMENTS

Overview

Figure 1B:
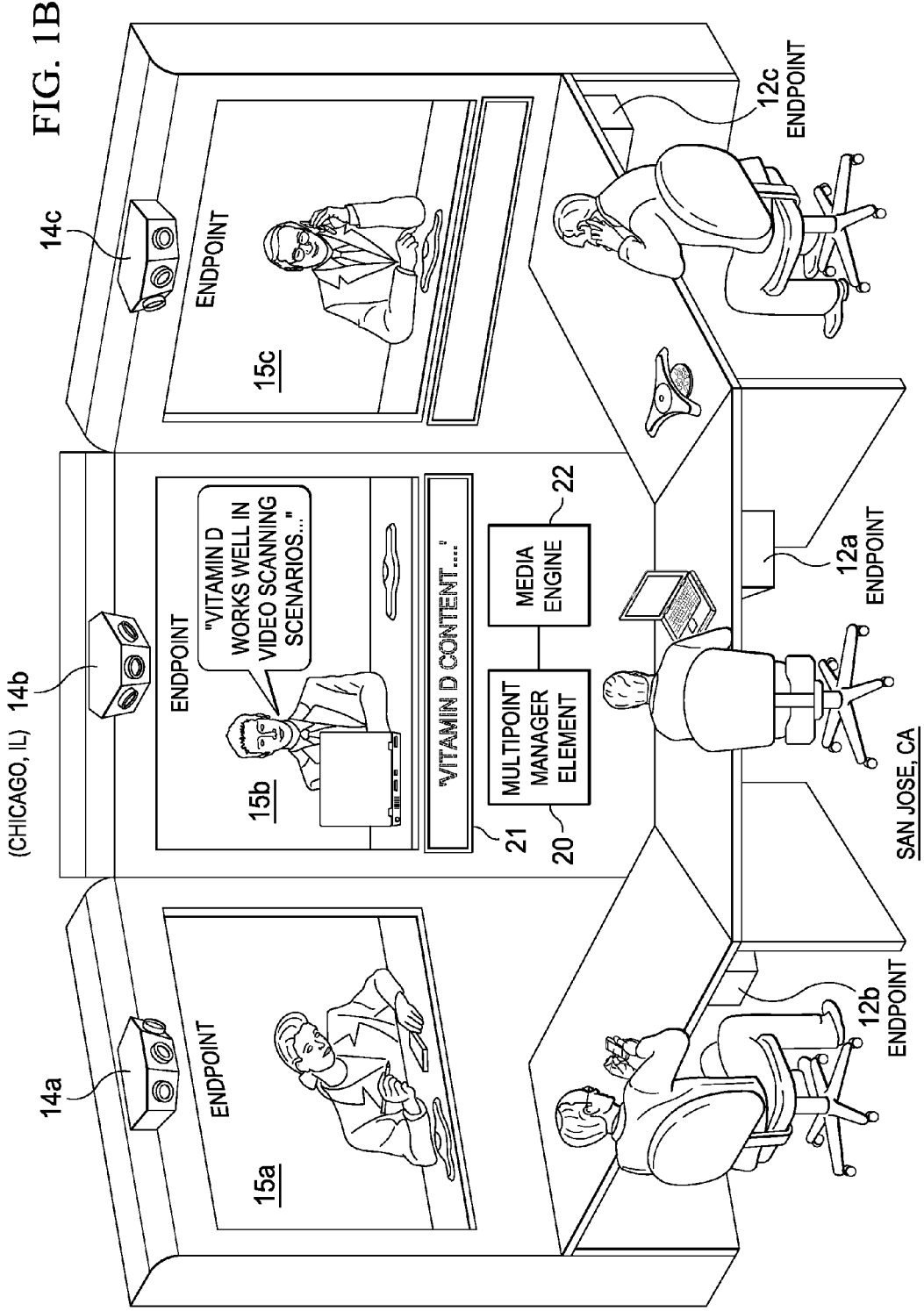
FIG. 1B is a simplified schematic diagram of a video conferencing arrangement that may utilize the augmented data features of the communication system.

A method is provided in one example and includes identifying a particular word recited by an active speaker in a conference involving a plurality of endpoints in a network environment; evaluating a profile associated with the active speaker in order to identify contextual information associated with the particular word; and providing augmented data associated with the particular word to at least some of the plurality of endpoints. In more specific examples, the active speaker is identified using a facial detection protocol, or a speech recognition protocol. Audio data from the active speaker can be converted from speech to text.

In yet other examples, information in the profile can be used to provide personal data (e.g., job title, user ID, avatar, symbol, job responsibility, business unit, etc.) about the active speaker to the plurality of endpoints. The augmented data can be provided on a display of a video conference. In alternative scenarios, the augmented data is provided as a message in a chat forum of an audio conference. The augmented data can also be provided as audio data delivered to at least some of the endpoints on particular end-user devices. In other implementations, profiles associated with the plurality of endpoints are evaluated in order to adjust the augmented data to be provided to each of the endpoints.

Example Embodiments

FIG. 1A is a simplified block diagram of a communication system 10 for providing augmented data in a network environment in accordance with one embodiment of the present disclosure. FIG. 1A may include an end user 12a, who is operating a computer device that is configured to interface with an Internet Protocol (IP) network 18a. In addition, an administrator 20 is provided, where administrator 20 has the ability to interface with the architecture through an IP network 18b. Communication system 10 may further include a network collaboration platform (NCP) 32, which includes an add to whitelist/blacklist module 34, a feedback loop module 36, and an administrator suggest interface 38. FIG. 1A may also include a central engine 40, which includes a profile database 39, a data augment module 41, a lightweight directory access protocol (LDAP) feeder element 42, a vocabulary feeder module 44, an emerging vocabulary topics element 46, and a table write service element 48.

FIG. 1A may also include a network sensor 54 that includes a first in, first out (FIFO) element 56, a media tagging module 52, a text extraction module 58, a blacklist 60, a document type filter 62, a noun phrase extractor module 64, a whitelist 66, a document splitter element 68, and a clean topics module 70. Multiple network sensors 54 may be provisioned at various places within the network and such provisioning may be based on how much information is sought to be tagged, the capacity of various network elements, etc.

Note that the teachings of the present disclosure can be best understood in the context of an example meeting scenario, which may be facilitated by a network connection. Consider an example involving a video conference (e.g., a Telepresence meeting) or an audio conference scenario (a WebEx meeting), where one of the participants discusses topics/subjects/keywords that are unfamiliar to his peers. In most scenarios, the peer group would interrupt the active speaker to clarify the unfamiliar terminology. Alternately, the peer group could quickly perform Internet searching and lookups to gain more knowledge about the subject matter. However, Internet searches can often lead to data that is irrelevant to the unfamiliar terminology. In one sense, latching onto a single word for searching activities may yield results that are contradictory. Moreover, all of these activities are distracting and, further, undermine the collaborative flow that occurs in most conferencing scenarios. Additionally, it is impolite to turn away from an active speaker in order to shift attention toward an external activity (e.g., Internet searching), even if that activity is associated with clarifying something that the active speaker recently mentioned.

In accordance with the teachings of the present disclosure, communication system 10 offers a solution that combines various technologies (e.g., speech-to-text, speaker identification, graphics overlay, etc.) to automatically detect that a particular topic/subject/keyword is not known to all the participants (e.g., in a Telepresence or WebEx session). Subsequently, augmented data can be sent to peer participants (some or all) in order to clarify certain subject matter. Such a strategy can improve the productivity of meetings (i.e., in real-time) by helping participants better understand an active speaker's word usage.

Identification of the active speaker can be done using any appropriate protocol. For example, facial detection algorithms can be used to identify the active speaker. Alternatively, speech patterns, speech recognition, voice recognition, pre-provisioning arrangements, etc. can be used in order to suitably identify the active speaker.

Operationally, as the video conference discussion is occurring in real-time, the architecture is performing speech detection activities (e.g., speech-to-text conversion) in order to identify new words, unfamiliar words, words that may have several interpretations or meanings, keywords, phrases, words that have some significance to one or more of the individuals involved in the discussion, etc. The analysis of potential new words (that can be targeted for augmented data) may be performed in conjunction with evaluating specific profiles (e.g., maintained in profile database 39) for individuals participating in the video conference. Hence, there can be an assumption made that certain profiles are being systematically maintained by the architecture such that patterns, new words, phrases, etc. can readily be identified.

In one example implementation, the active speaker stating the new word already has the associated context. This contextual information may be identified in any appropriate manner. For example, an analysis of an active speaker's profile could identify that he/she has matching contextual information for a specific word or phrase (e.g., a matching word is found in a file, a document, an e-mail, a job responsibility, a job role, etc.). Alternatively, members of certain groups (or having certain job titles and special responsibilities) would automatically have certain contexts. In other cases, personal vocabulary and/or enterprise vocabulary can be used as the basis for ascertaining such contextual information.

Because the active speaker using the particular word already has an appropriate context for the word usage, he/she need not be informed of additional information that further describes the topic. Instead, all the other members of the conference would receive additional augmented data formatted in any appropriate manner (e.g., provided as a uniform resource locator (URL) link, provided as a graphic, provided as a PDF, provided as a comment, provided as text, provided as a definition, provided as a media file, provided as a video segment, provided as audio data, provided as an instant message, provided as a short message service (SMS) text, provided as a message in a chat forum, etc.). In certain implementations, there is an interim step in which contextual information is identified, and then a quick summary is generated to guide the audience in the associated video conference, audio conference, etc. Hence, there could be an intelligent synopsis of the unfamiliar word provided to the other members of the conference.

The augmented data obviates the need for other conference members to become sidetracked in looking-up (e.g., Googling) certain terminology, which may be unfamiliar to them. The stated terminology may simply be unclear or need to be further distinguished through some supporting information, which can be provided by the augmented data, as discussed herein.

In certain scenarios, the augmented information can be abbreviated such that it offers a quick summary for the words mentioned by the primary speaker. This abbreviated information can allow the other members to continue to follow the discussion, while simultaneously viewing this data. The augmented data can be adjusted (i.e., tailored) for each individual person, where this can be based on their profile information, which can include their job responsibilities, their job title, their business unit, their personal vocabulary, their enterprise vocabulary, etc. For example, engineers could receive technical content, while marketing content could be pushed to advertising groups. Hence, any suitable augmented data may be provided to the individuals listening to the active speaker.

Turning to FIG. 1B, FIG. 1B is a simplified schematic diagram illustrating potential activities associated with a video conference. FIG. 1B includes multiple endpoints associated with various end users of the video conference. In general, endpoints may be geographically separated, where in this particular example, endpoints 12a-c are located in San Jose, Calif. and counterparty endpoints are located in Chicago, Ill. FIG. 1B includes a multipoint manager element 20 coupled to endpoints 12a-c. FIG. 1B also includes a media engine 22 coupled to multipoint manager element 20, where media engine 22 can be part of any of the components of the platform illustrated in FIG. 1A (e.g., provisioned in central engine 40, provisioned in network collaboration platform 32, provisioned in network sensor 54, etc.). For example, media engine 22 may be part of (or couple to) media tagging module 52 of network sensor 54.

In this example, each endpoint is fitted discreetly along a desk and is proximate to its associated participant. Such endpoints could be provided in any other suitable location, as FIG. 1B only offers one of a multitude of possible implementations for the concepts presented herein. In one example implementation, the endpoints are video conferencing endpoints, which can assist in receiving and communicating video and audio data. Other types of endpoints are certainly within the broad scope of the outlined concept, and some of these example endpoints are further described below. Each endpoint is configured to interface with a respective multipoint manager element, such as multipoint manager element 20, which helps to coordinate and to process information being transmitted by the end users.

As illustrated in FIG. 1B, a number of cameras 14a-14c and displays 15a-15c are provided for the conference. Displays 15a-15c render images to be seen by the end users and, in this particular example, reflect a three-display design (e.g., a 'triple'). Note that as used herein in this specification, the term 'display' is meant to connote any element that is capable of rendering an image during a video conference. This would necessarily be inclusive of any panel, screen, Telepresence display or wall, computer display, plasma element, television, monitor, or any other suitable surface or element that is capable of such rendering.

The components of video conferencing system of FIG. 1B may use specialized applications and hardware to create a system that can leverage a network. Furthermore, the video conferencing system can use Internet protocol (IP) technology and run on an integrated voice, video, and data network. The system can also support high quality, real-time voice, and video communications using broadband connections. It can further offer capabilities for ensuring quality of service (QoS), security, reliability, and high availability for highbandwidth applications such as video. Power and Ethernet connections for all end users can be provided. Participants can use their laptops to access data for the meeting, join a meeting place protocol or a Web session, or stay connected to other applications throughout the meeting.

In the particular implementation illustrated by FIG. 1B, as the active speaker recites certain language that triggers data augment module 41, a set of augmented data 21 is provided over the video stream (e.g., superimposed, similar to that of a news Teleprompter) such that members of the conference would not have to look down in order to gain clarification about particular word usages. In this case, the user at a specific endpoint has stated: 'Vitamin D works well in video scanning scenarios . . . ' Rather than have these surrounding (listening) parties mistakenly believe that this mentioning of 'Vitamin D' is associated with a nutritional reference, a quick video overlay can illustrate that (in fact) the active speaker is discussing the video company Vitamin D. Note that by positioning augmented data 21 directly on a video display, distractions can be minimized and (approximate) eye contact can suitably be maintained.

The text being provided as augmented data 21 can illuminate, flash, be provided in any suitable color, provided as audio through speakers, or be signaled in any other appropriate manner. In alternative cases, a faded graphic could be used to display augmented data 21 such that an individual would still be able to see through augmented data 21 to the underlying video. In other instances, a dedicated panel could be used to provide augmented data 21. In still other cases, user preferences can dictate where augmented data 21 would be provided (e.g., above the person speaking, at a local end user device (i.e., an iPad, a smartphone, a laptop, etc.), as a projection on a local wall or surface, on a dedicated device, etc.).

The profile development discussed herein may include both personal and enterprise vocabulary terminology such as that which is described in U.S. application Ser. No. 12/571, 414, filed Sep. 30, 2009, by Satish K. Gannu, et al., entitled "SYSTEM AND METHOD FOR PROVIDING SPEECH RECOGNITION USING PERSONAL VOCABULARY IN A NETWORK ENVIRONMENT," and U.S. application Ser. No. 12/571,390, filed Sep. 30, 2009, by Tangavelu Arumugam, et al., entitled "SYSTEM AND METHOD FOR GENERATING VOCABULARY FROM NETWORK DATA," both of which are hereby incorporated by reference in their entireties. Also, the speech recognition activities can be similar to those described in U.S. application Ser. No. 12/778,899, filed May 12, 2010, by Virgil N. Mihailovici, et al., entitled "SYSTEM AND METHOD FOR DERIVING USER EXPERTISE BASED ON DATA PROPAGATING IN A NETWORK ENVIRONMENT," which is hereby incorporated by reference in its entirety.

In operation, consider a simplistic video conferencing meeting involving three people (e.g., person A, B, and C) located in different video conferencing locations. Certain paradigms are in place in order to develop individual profiles for person A, B, and C. In a general sense, each profile is a complex metadata store of each person's work, interests, social activities, etc. The profile can include both personal and enterprise vocabulary terminology, along with relevant e-mails, documents, files, job responsibilities, job title, current work, extracurricular activities, etc. Some of this information may be filtered, pruned, or otherwise removed based on particular configuration needs.

In this particular example, person A mentions the phrase "Vitamin D." From a network perspective, the flow is propagated from person A's unit over the network to person B and to person C. Multipoint manager element 20 may perform speaker identification on the voice/audio such that persons A, B, and C are readily identified. As each person speaks, the audio is transcribed to generate text (i.e., some type of speech-to-text operation is executed).

The text can be suitably analyzed by any component (e.g., central engine 40) such that a determination is made that person B and person C are unfamiliar with vitamin d. This determination can include evaluating the profiles of person B and person C, and noting that this particular topic/subject/keyword is not in their profile. Subsequently, the platform (e.g., central engine 40) can recommend relevant content associated with 'Vitamin D', where the relevant content can be based on a particular user's interest or role.

The relevant content (forming the augmented data) is inserted or otherwise overlaid on the video streams for person B and person C. For example, in video conferencing, the augmented data may be provided as graphics overlaid on the screen such that participants can view the screen, while simultaneously reviewing the augmented data. In other scenarios involving WebEx, the augmented data may be provided as a private chat. Hence, person B and person C can review the augmented data being rendered on their screen, as person A continues with his dialogue uninterrupted.

In alternative embodiments of the present disclosure, speaker identification can be used in order to provide a graphics overlay in particular meeting scenarios (e.g., in video conferencing scenarios, in audio conferencing scenarios, etc.). For example, as each individual speaks, their audio data can be used to identify them as the active speaker. The profile of that active speaker is readily determined using any number of suitable protocols (e.g., speech recognition, voice recognition, pattern matching, pre-provisioning, facial detection, etc.). The speaker's name can be overlaid on the video as that speaker participates in a video conference. Hence, as a speaker talks, just below his image would be personal data, which may include his name, job title, certain profile details, a user ID, an avatar, a symbol, job responsibilities, business units, etc.) and/or any other suitable information that may be relevant to his peers.

Figure 1C:
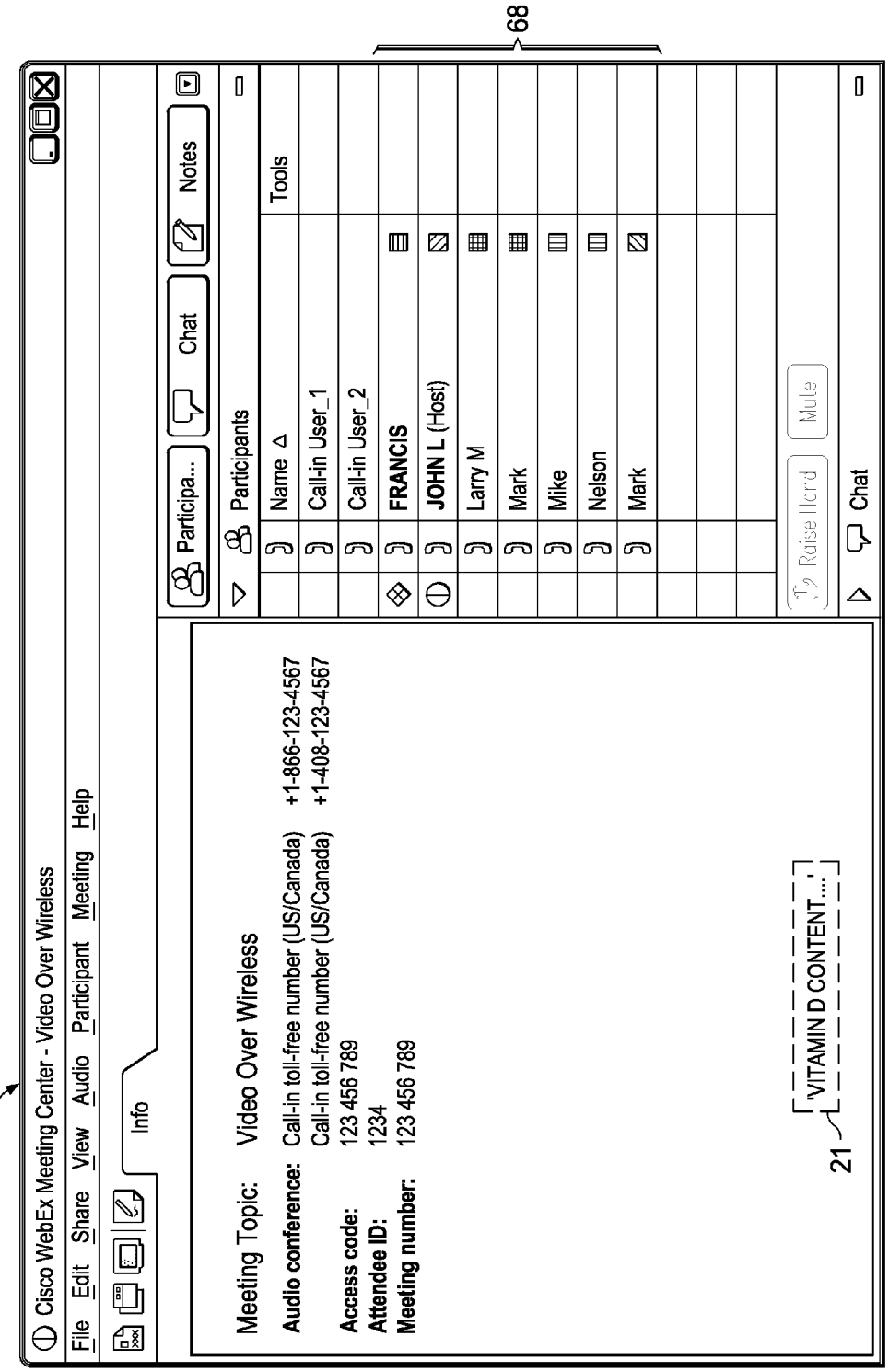
FIG. 1C is a simplified schematic diagram of an audio conferencing arrangement that may utilize the augmented data features of the communication system.

FIG. 1C is a simplified schematic diagram associated with the particular word illustrating an example audio conference platform that may utilize the teachings of the present disclosure. This particular scenario involves a WebEx platform; however, any suitable audio conferencing platform can readily adopt the teachings of the present disclosure. Semantically, WebEx is a web-based client and server application. A client module can be loaded onto an end user's endpoint via one or more webpages. A software module (e.g., a plug-in) can be delivered to a respective endpoint via the webpages. The plug-in can be downloaded (or suitably updated) before participating in the meeting. If the software module is already resident on the end user's endpoint (e.g., previously downloaded, provisioned through any other type of medium (e.g., compact disk (CD)), then while attempting to participate in an online meeting, that software module would be called to run locally on the endpoint. This allows a given endpoint to establish a communication with one or more servers (e.g., provisioned at a data center meeting zone and/or a data center web zone).

Static data can be stored in the data center web zone. For example, the scheduling data, the login information, the branding for a particular company, the schedule of the day's events, etc. can all be provided in the data center web zone. Once the meeting has begun, any meeting experience information can be coordinated (and stored) in the data center meeting zone. For example, if an individual were to share a document, or to pass the ball, then that meeting experience would be managed by the data center meeting zone. In a particular implementation, the data center meeting zone is configured to coordinate the augmented data activities with multipoint manager element 20 and/or media engine 22 (e.g., via software modules).

In this particular example of FIG. 1C, Francis was operating as the active speaker, and he mentioned the term Vitamin D. A quick profile lookup yielded a match for the video company Vitamin D in Francis' profile. For this reason, augmented data 21 was provided for the peers in this audio conference. In this particular example, augmented data was provided on the information tab; however, augmented data 21 can be provisioned in any appropriate location such as in a chat forum, as a cloud graphic, or in any other suitable fashion (some of which were discussed previously).

Turning to the infrastructure of communication system 10, IP networks 18*a-b* represent a series of points or nodes of interconnected communication paths for receiving and transmitting packets of information, which propagate through communication system 10. IP networks 18*a-b* offer a communicative interface between servers (and/or end users) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. IP networks 18*a-b* can implement a TCP/IP communication language protocol in a particular embodiment of the present disclosure; however, IP networks 18*a-b* may alternatively implement any other suitable communication protocol for transmitting and receiving data packets within communication system 10.

Note that central engine 40 can readily be part of a server in certain embodiments of this architecture. In one example implementation, central engine 40 is a network element that facilitates or otherwise helps coordinate the augmented data operations, as explained herein. (This includes the identification of the active speaker, speech-to-text conversions, etc., as described throughout this disclosure.) As used herein in this Specification, the term 'network element' is meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, central engine 40 includes software (e.g., as part of augmented data module 41) to achieve the augmented data operations, as outlined herein in this document. In other embodiments, this feature may be provided externally to any of the aforementioned elements, or included in some other network device to achieve this intended functionality. Alternatively, several elements may include software (or reciprocating software) that can coordinate in order to achieve the operations, as outlined herein. In still other embodiments, any of the devices of FIG. 1A-1B may include any suitable algorithms, hardware, software, components, modules, interfaces, or objects that facilitate these augmented data operations. Additional operational capabilities of communication system 10 are detailed below with respect to FIGS. 1B-4.

Figure 1D:
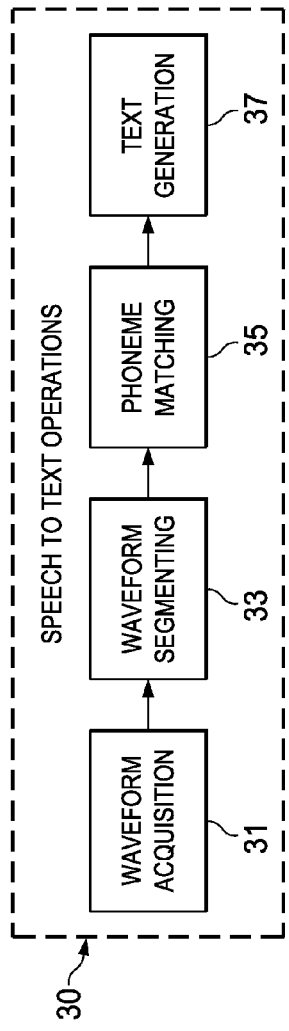
FIG. 1D is a simplified schematic diagram of speech-to-text operations that can be performed in the communication system in accordance with one embodiment.

Turning to FIG. 1D, FIG. 1D is a simplified schematic diagram illustrating a number of speech-to-text operations 30 that may occur within communication system 10. These activities may be performed in network sensor 54 in particular implementations of the present disclosure, or at any other suitable location. FIG. 1D includes a waveform acquisition element 31, a waveform segmenting element 33, a phoneme matching element 35, and a text generation element 37. The speech-to-text conversion can include a number of stages. For example, the waveform acquisition can sample the analog audio waveform. The waveform segmentation can break the waveform into individual phonemes (e.g., eliminating laughter, coughing, various background noises, etc.). Phoneme matching can assign a symbolic representation to the phoneme waveform (e.g., using some type of phonetic alphabet). In addition, the text generation can map phonemes to their intended textual representation (e.g., using the term "meet" or "meat"). If more than one mapping is possible (as in this example), a contextual analysis can be used to choose the most likely version.

In operation, media tagging module 52 can be configured to receive a media file (video, audio, etc.) and transform that information into a text tagged file, which is further passed to a document indexing function. More specifically, and in one example implementation, there is a separate workflow that occurs before text extraction activities are performed. This separate workflow can address media files, which require some type of conversion from audio to text. For example, if a video file were to be received, audio information would be identified and, subsequently, converted to text information to identify relevant enterprise vocabulary. An audio stream can be converted to a phonetic index file (i.e., a phonetic audio track). Once the phonetic index file is created, an enterprise vocabulary can be applied to search for enterprise terms within this phonetic index file. In one instance, the enterprise vocabulary may include one or more whitelist words, which can be developed or otherwise configured (e.g., by an administrator).

Applying the enterprise vocabulary can include, for example, taking each word within the enterprise vocabulary and searching for those particular words (e.g., individually) in the audio track. For example, for an enterprise vocabulary of 1000 words, a series of application program interfaces (APIs) can be used to identify that a given word ("meet") is found at specific time intervals (T=3 seconds, T=14 seconds, T=49 seconds, etc.). The resultant could be provided as a list of 40 words (in this particular example).

This list can be checked against a personal vocabulary database, which is particular to the end user who is seeking to send, receive, upload, etc. this media file. Thus, the personal vocabulary (e.g., having 250 words) can be loaded and leveraged in order to eliminate false positives within the 40 words. This could further reduce the resultant list to 25 words. A resulting text file can be fed to text extraction module 58 for additional processing, as outlined herein.

In other operational capacities involving the development of profiles, communication system 10 can offer an intelligent filtering of words by leveraging the personal vocabulary of the individual who is associated with the collected data. The personal vocabulary can be developed in a different workflow, where the elimination of false positives represents an application of that personal vocabulary against an incoming media file. For example, as the system processes new end user media files (e.g., video, audio, any combination of audio/video, etc.), an additional layer of filtering can be performed that checks the collected (or tagged) terms against personal vocabulary. Thus, if a particular end user has a personal vocabulary that includes the term "meet", then as media files are identifying phonetically accurate words (e.g., "meet", "meat") in the audio track, the extraneous term (i.e., "meat") would be eliminated as being a false positive. Note that the probability of a personal vocabulary having two words that phonetically sound the same is low. This factor can be used in order to remove a number of false positives from information that is collected and sought to be tagged. This engenders a higher quality of phoneme-based speech recognition. Hence, the personal vocabulary can be used to increase the accuracy of terms tagged in media file scenarios.

In one general sense, an application can be written on top of the formation of an intelligent personal vocabulary database. A partitioned personal vocabulary database can be leveraged in order to further enhance accuracy associated with incoming media files (subject to tagging) to remove false positives that occur in the incoming data. Thus, the media tagging activity is making use of the personal vocabulary (which is systematically developed), to refine phoneme tagging.

The personal vocabulary developed by communication system 10 can be used to augment the tagging results associated with video or audio files. Phoneme technology breaks down speech (for example, from analog to digital, voice segmenting, etc.) in order to provide text, which is based on the media file. For example, as a video file enters into the system, the objective is to capture relevant enterprise terms to be stored in some appropriate location. The repository that stores this resultant data can be searched for terms based on a search query. Phonetic based audio technology offers a mechanism that is amenable to audio mining activities. A phonetic-index can be created for every audio file that is to be mined. Searches can readily be performed on these phonetic indices, where the search terms could be free form.

In one example, an end user can upload a video file onto the system. Enterprise vocabulary can be tagged for this particular video file (e.g., using various audio-to-text operations). The resulting enterprise vocabulary can be confirmed based on that particular end user's personal vocabulary, which has already been amassed. For example, if an original tagging operation generated 100 tags for the uploaded video file, by applying the personal vocabulary check, the resulting tags may be reduced to 60 tags. These resulting 60 tags are more accurate, more significant, and reflect the removal of false positives from the collection of words. Additional details related to media tagging module 52 are provided below with reference to FIG. 1E. Before turning to those details, some primary information is offered related to how the underlying personal vocabulary is constructed and developed.

Communication system 10 can intelligently harvest network data from a variety of end users, and automatically create personal vocabulary from business vocabulary by observing each user's interaction/traffic on the network. In a general sense, the architecture can isolate terms per person in order to define an end user's personal vocabulary. This information can subsequently be used to identify specific experts. In other instances, the personal vocabulary can be used for topic-based social graph building (e.g., social networking applications). In other instances, this information can be used to improve the accuracy of speech-to-text translations, which can relate to the individual applications being used by the person, a particular environment in which the end user participates, feature invocation applications, etc. The solution can intelligently and dynamically auto generate different lists of personal vocabulary per user without creating additional overhead for the end users.

As part of its personal vocabulary development activities, communication system 10 can tag words for specific end users. For example, relevant words identified in an enterprise system can be extracted from the documents, which are flowing through the network. The tags can be categorized and then associated to the user, who generated or who consumed each document. In accordance with one example implementation, a tag can be given different weights depending on several potential document characteristics. One characteristic relates to the type of document propagating in the network (for example, email, an HTTP transaction, a PDF, a Word document, a text message, an instant message, etc.). Another characteristic relates to the type of usage being exhibited by the end user. For example, the system can evaluate if the end user represents the producer of the content (e.g., the sender, the poster, etc.), or the consumer of the content (e.g., the recipient, the audience member, etc.).

In one example, if the end user were posting a document including the identified vocabulary, the act of posting such words would accord the words a higher weight, than merely receiving an email that includes the particular vocabulary words. Stated in different terms, in a forum in which the end user is authoring a document to be posted (e.g., on a blog, on a corporate website, in a corporate engineering forum, etc.), vocabulary words within that document would have a higher associative value than if the words were propagating in lesser forums (e.g., a passive recipient in an email forum). Yet another characteristic relates to a probability of a term showing up in a document. (Note that multiple word terms have a lower probability of occurrence and, therefore, carry a higher weight when they are identified). In one instance, the tagged vocabulary words can be aggregated using streaming databases, where the aggregated tags can be stored and archived in a summarized format.

The resulting information may be suitably categorized in any appropriate format. For example, a dynamic database (e.g., table, list, etc.) can be generated for each individual user, each user-to-user communication (e.g., 1-1, N or N, etc.), and each type of document (e.g., email, phone conversation messages, Meeting Place meeting data, WebEx data, blog posting, White Paper, PDF, Word document, video file, audio file, text message, etc.). Essentially, any type of information propagating in the network can be suitably categorized in the corresponding database of the tendered architecture. Some of the possible database configurations are described below with reference to FIG. 2.

It should be noted that there are several different types of objects flowing through the architecture of communication system 10. Components within communication system 10 can identify which objects should be processed by particular components of the configuration. One set of objects relates to media files. These can be received by FIFO element 56 and subsequently passed to media tagging module 52. The resultants (from processing, which occurs at media tagging module 52) is then passed to text extraction module 58.

In operation of an example that is illustrative of business vocabulary being developed, at vocabulary feeder module 44, data can be sent by noun phrase extractor module 64, (i.e., the content field) and this can be used for vocabulary suggestion for administrator 20. This data can be anonymous, having no user concept. For LDAP feeder element 42, whitelisted terms are provided and, further, this can be used for personal vocabulary building, as discussed herein. In essence, this data belongs to a particular user; it is a document associated to a user. Thus, there are two distinct workflows occurring in the architecture, which processes different types of documents for different purposes.

For the business vocabulary workflow, one aspect of the architecture involves a noun phrase extraction component, which can be provided along with filtering mechanisms, and stream access counts to retrieve popular and/or new vocabulary terms. In one example implementation, involving the development of business vocabulary, the architecture can suggest words and phrases that are potential vocabulary candidates. Multi-word phrases can be given more weight than single word terms. The decision whether to include these words in the whitelist or the blacklist can rest with the vocabulary administrator. The administrator can also decide if the words should never be brought to his attention again by marking them for addition to the list of administrator stop words. This can take the form of a feedback loop, for example, from the NCP user interface to the network sensor/central engine (depending on where the stop word removal component may reside).

In one example embodiment, only a certain domain of data (e.g., words) of vocabulary is tagged. As used herein in this Specification, the term 'data' is meant to encompass any information (video, text, audio, multimedia, voice, etc.) in any suitable format that propagates in a network environment. The particular domain could be provided in a whitelist, which reflects specific network content. In one example implementation, administrator 20 can develop a certain domain that respects privacy issues, privileged content, etc. such that the ultimate composite of documents or files would reflect information capable of being shared amongst employees in a corporate (potentially public) environment. In certain implementations, the resultant composite of documents (i.e., data) can help to identify experts associated with specific subject matter areas; however, there are a myriad of additional uses to which communication system 10 can apply. As used herein in this Specification, the term 'resultant composite' can be any object, location, database, repository, server, file, table, etc. that can offer administrator 20 the results generated by communication system 10.

Figure 1E:
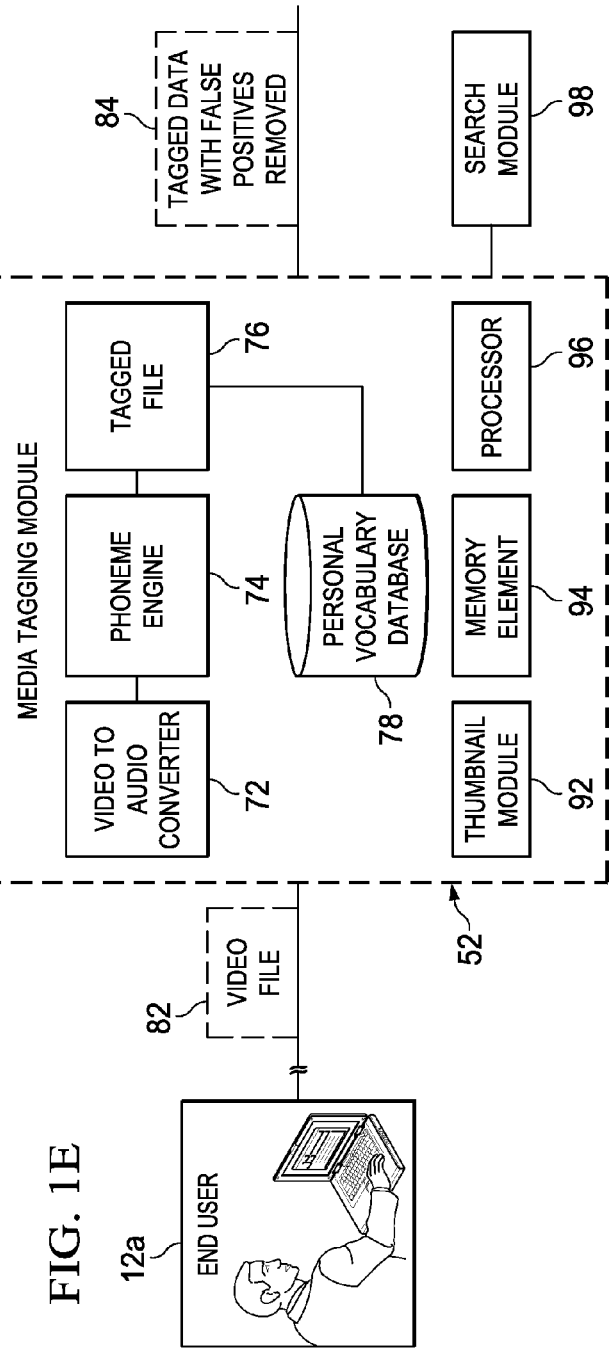
FIG. 1E is a simplified block diagram of a media tagging module of the communication system in accordance with one embodiment.

FIG. 1E is a simplified block diagram that illustrates additional details relating to an example implementation of media tagging module 52. Media tagging module 52 may include a video-to-audio converter 72, a phoneme engine 74, a tagged file 76, a thumbnail module 92, a memory element 94, a processor 96, and a personal vocabulary database 78. A raw video file 82 can be sought to be uploaded by end user 12a, and it can propagate through media tagging module 52 in order to generate tagged data with false positives removed 84. Additionally, a search module 98 is also provided in FIG. 1E and this element can interact with media tagging module 52 in order to search information that has already been intelligently filtered using the various mechanisms outlined herein. For example, a search interface could be provided (to a given end user) and the interface could be configured to initiate a search for particular subject areas within a given database. The removal of false positives can occur at an indexing time such that when an end user provides a new search to the system, the database is more accurate and, therefore, a better search result is retrieved.

In the context of one example flow, media can be extracted from HTTP streams, where it is subsequently converted to audio information. The audio track can be phonetic audio track (PAT) indexed. Appropriate tags can be generated and indexed, where thumbnails are transported and saved. Queries can be then served to the resulting database of entries (e.g., displayed as thumbnails), where relevant video and audio files can be searched. Duplicate video entries can be removed, modified, edited, etc. on a periodic basis (e.g., by an administrator, or by some other individual). In addition, the appropriate video or audio player can offer a suitable index (e.g., provided as a "jump-to" feature) that accompanies the media.

Speech recognition can be employed in various media contexts (e.g., video files, Telepresence conferences, phone voicemails, dictation, etc.). In addition, any number of formats can be supported by communication system 10 such as flash video (FLV), MPEG, MP4, MP3, WMV, audio video interleaved (AVI), MOV, Quick Time (QT) VCD, MP4, DVD, etc. Thumbnail module 92 can store one or more thumbnails on a platform that connects individual end users. The platform could be (for example) used in the context of searching for particular types of information collected by the system.

Figure 1F:
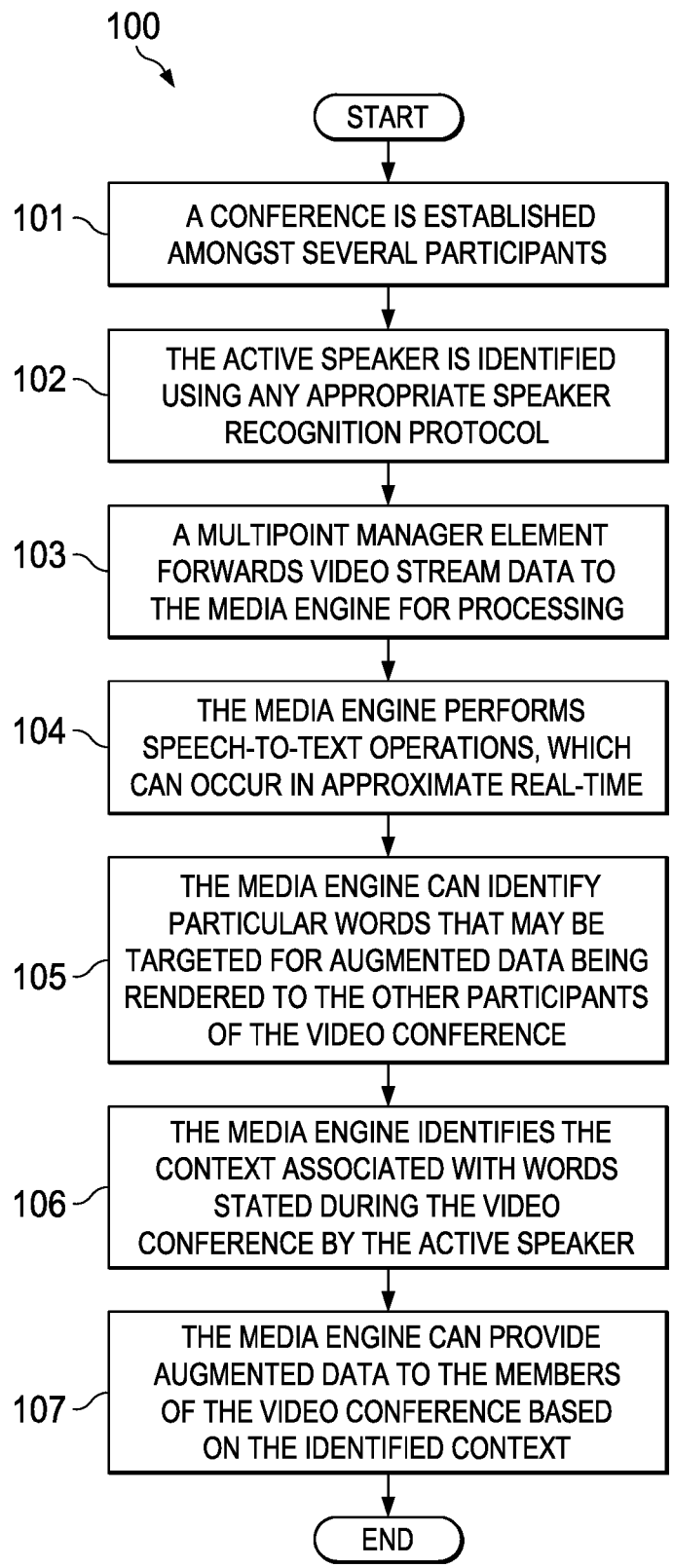
FIG. 1F is a simplified flowchart illustrating an example flow associated with the communication system.

FIG. 1F is a simplified flowchart 100 illustrating a general flow associated with communication system 10. The flow may begin at 101, where a conference (e.g., involving video and/or audio) is established amongst several participants. At 102, the active speaker is identified using any appropriate speaker recognition protocol (e.g., facial detection, speech recognition, pre-provisioning paradigms, etc.). The speaker recognition can occur at multipoint manager element 20, at central engine 40, or at any other appropriate location. For example, if multipoint manager element 20 identifies the active speaker, then an identifier associated with the active speaker can be communicated to a suitable media engine, which may be part of network sensor 54.

At 103, multipoint manager element 20 may forward video stream data to the media engine. This particular media engine is configured to execute speech-to-text operations, active speaker identification, context identification, profile look up operations, etc. [It should also be noted that the architecture can be configured such that the media engine is constantly receiving video streams from multipoint manager element 20 from the outset of the video conference. The media engine would understand which video streams correspond to each individual user.] At 104, the media engine performs speech-to-text operations, which can occur in approximate real-time. At 105, the media engine can identify particular words that may be targeted for augmented data being rendered to the other participants of the video conference.

Any suitable analysis can be used in order to identify words that would benefit from the use of augmented data, which further clarifies, explains, or supports the context associated with the active speaker. For example, profiles can be evaluated in order to determine words that are new, foreign, or otherwise unfamiliar to people in the video conference such that these individuals would benefit from augmented data being shown to them. In other instances, the active speaker could have designated a theme for this particular video conference such that, even though some of the participants may have some (possibly limited) familiarity with the terminology being used, augmented data would be used to reinforce some significance or importance associated with the stated verbiage.

At 106, the media engine identifies the context associated with words stated during the video conference by the active speaker. This identification can include suitable lookup operations, matching activities, profile evaluations, e-mail analysis, document analysis, directory analysis, job responsibility/job title analysis, etc. All such possibilities are included within the broad term 'augmented data' as used herein in this Specification. At 107, the media engine can provide augmented data to the members of the video conference based on the identified context. The media engine has the intelligence to compose video data to be sent back to the multipoint manager element for rendering at any appropriate location. For example, this can include providing specific video and/or audio information to individual participants or endpoints (along designated channels) during the video conference. The active speaker would not receive this information, as only his peers would desire such information to be provided. In alternative scenarios, the augmented data is rendered uniformly for everyone in the video conference.

Turning to technical details related to how the personal vocabulary and the augmented data are developed, FIG. 2 is a simplified block diagram of an example implementation of central engine 40. In this particular example, multipoint manager element 20 includes a memory element 86b and a processor 88b, while media engine 22 may include a memory element 86c and a processor 88c. Additionally, central engine 40 includes a memory element 86a and a processor 88a in this particular configuration. In a particular arrangement, central engine 40 includes media engine 22 such that they are provisioned in a single device.

Central engine 40 also includes a junk filter mechanism 47 (which may be tasked with removing erroneous vocabulary items), a vocabulary module 49, a weighting module 55, a streaming database feeder 50, a MQC 59, a CQC 61, a topics database 63, a collaboration database 65, an indexer module 67, and an index database 69. Indexer module 67 is configured to assist in categorizing the words (and/or noun phrases) collected in communication system 10. Those indices can be stored in index database 69, which can be searched by a given administrator or an end user. Along similar reasoning, topics database 63 can store words associated with particular topics identified within the personal vocabulary. Collaboration database 65 can involve multiple end users (e.g., along with administrator 20) in formulating or refining the aggregated personal vocabulary words and/or noun phrases. In regards to vocabulary module 49, this storage area can store the resultant composite of vocabulary words (e.g., per individual), or such information can be stored in any of the other databases depicted in FIG. 2.

It is imperative to note that this example of FIG. 2 is merely representing one of many possible configurations that the system (e.g., central engine 40) could have. Other permutations are clearly within the broad scope of the tendered disclosure. For example, multipoint manager element 20, central engine 40, and/or media engine 22 can readily be combined. Similarly, any of the augmented data software features can be present in these components, or a single component (e.g., a chassis having multiple blades provided therein) can be provisioned to accomplish many (or all) of the features described herein (e.g., speech-to-text, active speaker identification, augmented data, identifying new (or unfamiliar) words, etc.).

In operation of a simplified example associated with personal vocabulary activities, the extraction and processing operations can be performed on network sensor 54, where those results may be provided to central engine 40 for building personal vocabulary. With respect to the initial text stripping operations, noun phrase extractor module 64 can find the noun phrases in any text field. In more specific implementations, pronouns and single words are excluded from being noun phrases. A noun phrase can be part of a sentence that refers to a person, a place, or a thing. In most sentences, the subject and the object (if there is one) are noun phrases. Minimally, a noun phrase can consist of a noun (e.g., "water" or "pets") or a pronoun (e.g., "we" or "you"). Longer noun phrases can also contain determiners (e.g., "every dog"), adjectives (e.g., "green apples") or other preceding, adjectival nouns (e.g., "computer monitor repair manual"), and other kinds of words, as well. They are called noun phrases because the headword (i.e., the word that the rest of the phrase, if any, modifies) is a noun or a pronoun. For search and other language applications, noun phrase extraction is useful because much of the interesting information in text is carried by noun phrases. Also, most search queries are noun phrases. Thus, knowing the location of the noun phrases within documents and, further, extracting them can be an important step for tagging applications.

For the end-user interface, periodically, terms can be suggested to the administrator for adding to the vocabulary. The existing interface for user-suggested vocabulary could be used for displaying the terms to the administrator. In one example implementation, a stop word removal feature can be provided on central engine 40 (e.g., this could make implementation of the feedback loop more efficient). In other instances, the stop word removal feature is placed on network sensor 54 so that only the filtered fields are sent over to central engine 40. The concept field can be accessible like other fields in the received/collected documents. The concept field is a list of string field values. Additional functionalities associated with these operations are best understood in the context of several examples provided below.

While this is occurring, in a separate workflow personal vocabulary can be developed. Thus, communication system 10 can generate personal vocabulary using corporate vocabulary, which is propagating in the network. In practical terms, it is difficult to tag all user traffic in a corporate (i.e., enterprise) environment. There are two modes in which corporate vocabulary can be generated. First, in a learning mode, where end users are not yet subscribed, automatic corporate vocabulary can be generated by tagging content as it flows through the network. This can be generated by tagging content anonymously in the network. This typically happens in the learning mode of the system, where no users are subscribed on the system. The user whose content is being tagged is not necessarily of interest at the time of corporate vocabulary generation. Second, in a real-time system scenario, as users begin using the system, users have the ability to suggest new words to the corporate vocabulary through a manual process, feedback loops, etc., which are detailed herein.

By contrast, personal vocabulary generation can use corporate vocabulary to tag words for particular users. As documents (e.g., email/http/videos, PDF, etc.) flow through the network, the system checks for words from the corporate vocabulary, tags the appropriate words (e.g., using a whitelist), and then associates those words with particular users. Communication system 10 can include a set of rules and a set of algorithms that decide whether tagged words should be added to a personal vocabulary. Rules include common term threshold, group vocabulary adjustment, etc. Over a period, the user's personal vocabulary develops into a viable representation of subject areas (e.g. categories) for this particular end user. In addition, the user has the ability to add words to his personal vocabulary manually. He also has the ability to mark individual words as public or private, where the latter would prohibit other users in the system from viewing those personal vocabulary words.

Many of these activities can be accomplished by using streaming databases in accordance with one example implementation. In one particular instance, this involves the use of streaming database feeder 50. A streaming database continuously analyzes massive volumes of dynamic information. Streaming database feeder 50 can create a user sub-stream for each user, where the tags could continuously be updated for that user. By writing a simple query, an individual can derive the most prevalent topics (e.g., based on a normalized count and time).

FIGS. 3 and 4 offer two distinct workflows for the present disclosure. FIG. 3 addresses the corporate vocabulary formation, whereas FIG. 3 addresses the personal vocabulary development. It should also be noted that these illustrations are associated with more typical flows involving simplistic documents propagating in a network (e.g., e-mail, word processing documents, PDFs, etc.).

FIG. 3 is a simplified flowchart illustrating one example operation associated with communication system 10. In this particular flow, at 110, end user 12a has written an email that includes the content "Optical Switching is a terrific technology." This email message can traverse the network and be received at a router (e.g., a large corporate router, a switch, a switched port analyzer (SPAN) port, or some type of virtual private network (VPN) network appliance). This is reflected by 120. Network sensor 54 can be provisioned at such a location in order to capture data and/or facilitate the identification of content, as described herein.

In this particular example, FIFO element 56 may receive data in a raw format at 130. Text extraction module 58 may extract certain fields in order to identify a title, text, authorship, and a uniform resource locator (URL) associated with this particular document at 140. [Note that as used herein in this Specification, the term 'separate' is used to encompass extraction, division, logical splitting, etc. of data segments in a data flow. The term 'tag' as used herein in this Specification, is used to encompass any type of labeling, maintaining, identifying, etc. associated with data.] Note that for this particular instance (where an email is being sent), the URL can have a blank field. The title may include a subject line, or an importance/priority parameter, and the text field would have the quoted statement (i.e., content), as written above. The document is then passed to blacklist 60, which searches (i.e., evaluates) the document to see if any blacklisted words are found in the document (150). If any such blacklisted words are present, the document is dropped. In one general sense, there are two layers of privacy provided by blacklist 60 and whitelist 66, which are working together. Examples of blacklist words in a corporate environment may include 'salary', 'merger', etc., or possibly words that might offend public users, compromise privacy issues, implicate confidential business transactions, etc. Note that the blacklist (much like the whitelist) can readily be configured by administrator 20 based on particular user needs. The term 'whitelist' as used herein in this Specification is meant to connote any data sought to be targeted for inclusion into the resultant composite of words for administrator 20. Along similar reasoning, the term 'blacklist' as used herein is meant to include items that should not be included in the resultant composite of words.

Provided that the document in this instance is not dropped as a result of the blacklist check, the document passes to document filter 62. Document filter 62 performs a quick check of the type of document that is being evaluated at 160. Again, this component is configurable as an administrator can readily identify certain types of documents as including more substantive or meaningful information (e.g., PDF or Word processing documents, etc.). Along similar reasoning, some documents (such as JPEG pictures) may not offer a likelihood of finding substantive vocabulary (i.e., content) within the associated document. These more irrelevant documents may be (as a matter of practice) not evaluated for content and any such decision as to whether to ignore these documents (e.g., JPEG pictures), or scrutinize them more carefully would be left up to administrator 20.

In one example, noun phrase extractor module 64 includes a natural language processing (NLP) component to assist it in its operations. Note that a similar technology may exist in text extraction module 58 to assist it in its respective operations. One objective of noun phrase extractor module 64 is to extract meaningful objects from within text such that the content can be aggregated and further processed by communication system 10. In this example, noun phrase extractor module 64 performs its job by extracting the terms "optical switching" and "technology." This is illustrated by 170.

Once this document has propagated through noun phrase extractor module 64, the document passes to whitelist 66 at 180. An administrator may wish to pick up certain whitelisted words in the content, as it propagates through a network. The whitelist can be used on various fields within communication system 10. In this particular example, the whitelist is used to search the title and text fields. At this point, the document is sent to document splitter element 68. Note that there are two documents being created from the original document. In one instance, document splitter element 68 can receive a document with five fields including the concept field (at 190), and perform several operations. First, it creates document #2 using the concept field in document #1. Second, it removes the concept field from document #1. Third, it can remove all fields except the concept field from document #2. Fourth, it can send both document #1 and document #2 to clean topics module 70.

It should be noted that noun phrase extractor module 64 operates best when considering formal statements (e.g., using proper English). Colloquialisms or folksy speech is difficult to interpret from the perspective of any computer system. More informal documentation (e.g., email) can be more problematic, because of the speech that dominates this forum.

Clean topics module 70 is configured to address some of these speech/grammar issues in several ways. In one example implementation, clean topics module 70 can receive two documents, as explained above. It passes document #1 without the concept field. For document #2, having the concept field, it can be configured to employ stop word removal logic at 200. In this particular arrangement, the following stop words can be removed: first name, last name, userid; functional stop word: A, an, the, etc.; email stop words: regards, thanks, dear, hi, etc.; non-alphabets: special characters, numbers; whitelist words: all words found in a whitelist file configured by the administrator; administrator stop words: administrator rejected system words. Note that the operation of filtering functional stop words is different from filtering email (e.g., administrator stop words). For example, "Back Of America" would not be processed into "Bank America." Thus, stop words between two non-stop words would not necessarily be removed in certain instances.

In addition, and in this particular example, the following rules can be applied: Rule 1: Remove the entire noun phrase if a substring match is found; Rule 2: Remove only the offending culprit; Rule 3: Remove the entire noun phrase if an exact match is found. Particular to this example, rules can be applied in the following order: Drop concept fields containing non-alphabets (Rule 1); Drop concept fields containing (e.g., LDAP) entries (Rule 1); Drop concept fields containing email stop words (Rule 1); Remove the functional stop word only if it is at either end of the concept field. Do not drop the words found in between, apply rule iteratively (Rule 2). Drop the concept field value if it is an exact match with the whitelist words (Rule 1). Drop the concept field value if it is an exact match with the administrator stop words (Rule 1). Note that LDAP filtering can also occur during these activities. For example, if any proper names already in LDAP are identified, the filter can just drop those terms.

Vocabulary feeder module 44 can receive the documents (e.g., on the central engine side) at 210. Vocabulary feeder module 44 forwards the document without the concept field and, for the document with the concept field, it sends it to streaming database feeder 50. In one instance, the streams are associated with storage technology, which is based on a stream protocol (in contrast to a table format). In other instances, any other suitable technology can be employed to organize or to help process the incoming documents, content, etc. The streams can be updated by vocabulary feeder module 44.

More specifically, the analytics approach of central engine 40 (in one example) involves having queries analyze streaming data. This strategy for handling continuously flowing data is different from traditional business intelligence approaches of first accumulating data and then running batch queries for reporting and analysis. Such an approach enables analysis of heterogeneous data regardless of whether the data is flowing, staged, etc. In addition, queries are continuous and constantly running so new results are delivered when the downstream application can use them. Data does not need to be stored or modified, so the system can keep up with enormous data volumes. Thousands of concurrent queries can be run continuously and simultaneously on a server architecture. Queries can be run over both real-time and historical data. Incoming data can be optionally persisted for replay, back-testing, drill-down, benchmarking, etc.

Returning to the flow of FIG. 3, vocabulary feeder module 44 can read the concept field (e.g., created by the NLP module) and can feed the noun phrases to the raw vocabulary stream (e.g., "raw_vocab_stream" file) at 220. The vocabulary feeder mechanism can calculate the weight of each of the topics in the concept field by looking up a hash map (initialized from a file) between the number of terms and corresponding weight and, subsequently, feed the topic, calculated weight, and timestamp into the raw vocabulary stream. The vocabulary feeder's output can be configured to interface with the vocabulary stream. The streams aggregate the topics into (for example) a weekly collapsed vocabulary table (e.g., "weekly_collapsed_vocab_table" file), which could be updated during any suitable timeframe (e.g., hourly). This table serves as input to table write service element 48.

In regards to the periodic write service, a periodic service can invoke the write to administrator table service, as explained above. This service can be configurable for the following: silent mode, hourly, daily, weekly, monthly. Hourly, daily, weekly, and monthly modes designate that the terms are suggested to an administrator on the specified intervals. Hourly intervals could be used for testing purposes. A silent mode offers a file based approach, where terms are written to a file, and do not make it to the administrator user interface.

For table write service element 48, a service layer can read the weekly collapsed vocabulary table for the top words and write to the administrator user interface table. The administrator user interface table can represent the shared table between user-suggested vocabulary terms and the system suggested vocabulary terms. Administrator suggest interface 38 can read the user-suggested vocabulary table ("userSuggestedVocabulary table") to display the terms. This module can suggest the top 'n' words to the administrator for adding to the vocabulary whitelist. Feedback loop module 36 may include application program interfaces (APIs) being provided to create a file from the table of suggested vocabulary terms.

In this example, administrator suggest interface 38 reads the weekly collapsed vocabulary table to display the terms at 230. This element also suggests the top (e.g., 'n') words to administrator 20 for addition to the vocabulary whitelist. The administrator is provided a user interface to make decisions as to whether to add the term to the whitelist, add it to the blacklist, or to ignore the terms. In one example implementation, the administrator does not suggest new stop words. Only system suggested (or user suggested) stop words can be rejected.

Feedback loop module 36 is coupled to administrator suggest interface 38. In case the administrator chooses the "reject term" option, the system can add the term to the list of existing stop words and, further, propagate it to network sensor 54 to copy over to a file (e.g., adminStopWords.txt). This is reflected by 240. Network collaboration platform 32 can create a file from the table suggested vocabulary terms (e.g., via commands including suggestedby=system, and status=rejected). This file can be a part of the force sync files that can be pushed to the network sensor/central engine (depending on where the stop words mechanism resides). At 260, emerging vocabulary topics element 46 can look up emerging topics (e.g., within harvested documents) and, systematically, add the emerging and top topics to the architecture for the administrator to consider. Both options can be provided to administrator 20. The emerging topics can be similar to the experience tags such that topics growing in prominence over a given time interval (e.g., a week) can be suggested to administrator 20.

FIG. 4 is a simplified flowchart illustrating one example operation associated with communication system 10. In this particular flow, an email is written from a first end user (John) to a second end user (Bill) at 210. The email from John states, "Search engines are good" and this is evaluated in the following ways. First, authorship is identified and the email is searched for blacklisted and whitelisted words at 220. In essence, a number of text stripping operations occur for the received document (as outlined previously above in FIG. 3). Second, the whitelisted words are received at LDAP feeder element 42 at 230. In one sense, the appropriate concept has been extracted from this email, where insignificant words have been effectively stripped from the message and are not considered further.

At 240, John is associated with the term "search engine" based on John authoring message and, in a similar fashion, Bill is associated with the term "search engine" based on him receiving this message. Note that there is a different weight associated with John authoring this message, and Bill simply receiving it. At 250, weighting module 55 can be invoked in order to assign an intelligent weight based on this message propagating in the network. For example, as the author, John may receive a full point of weight associated with this particular subject matter (i.e., search engines). As the recipient, Bill may only receive a half point for this particular subject matter relationship (where Bill's personal vocabulary would include this term, but it would not carry the same weight as this term being provided in John's personal vocabulary).

In addition, and as reflected by 260, weighting module 55 may determine how common this word choice (i.e., "search engine") is for these particular end users. For example, if this were the first time that John has written of search engines, it would be inappropriate to necessarily tag this information and, subsequently, identify John as an expert in the area of search engines. This email could be random, arbitrary, a mistake, or simply a rare occurrence. However, if over a period, this terminology relating to search engines becomes more prominent (e.g., reaches a threshold), then John's personal vocabulary may be populated with this term.

In this particular example, several days after the initial email, John sends Bill a second email that includes a white paper associated with search engines, along with an accompanying video that is similarly titled. This is reflected by 270. Central engine 40 has the intelligence to understand that a higher weight should be accorded to this subsequent transmission. Intuitively, the system can understand that certain formats (White Papers, video presentations, etc.) are more meaningful in terms of associating captured words with particular subject areas. At 280, weighting module 55 assigns this particular transmission five points (three points for the White Paper and two points for the video presentation), where the five points would be allocated to John's personal vocabulary associated with search engines. In addition, Bill is also implicated by this exchange, where he would receive a lesser point total for (passively) receiving this information. In this instance, and at 290, Bill receives three points as being a recipient on this email. At 300, the point totals are stored in an appropriate database on a per-user basis.

Additionally, over time, a social graph can be built based on the connection between John and Bill and, in particular, in the context of the subject area of search engines. In one sense, the weight between these two individuals can be bidirectional. A heavier weight is accorded to John based on these transmissions because he has been the dominant author in these exchanges. If Bill were to become more active and assume an authorship role in this relationship, then the weight metric could shift to reflect his more proactive involvement. In one particular example, a threshold of points is reached in order for Bill's personal vocabulary to include the term 'search engine.' This accounts for the scenario in which a bystander is simply receiving communications in a passive manner.

The architecture discussed herein can continue to amass and aggregate these counts or points in order to build a personal vocabulary (e.g., personal tags) for each individual end user. The personal vocabulary is intelligently partitioned such that each individual has his own group of tagged words to which he is associated. At the same time, a social graph can continue to evolve as end users interact with each other about certain subject areas.

In contrast to other systems that merely identify two individuals having some type of relationship, the architecture provided herein can offer the context in which the relationship has occurred, along with a weighting that is associated with the relationship. For example, with respect to the John/Bill relationship identified above, these two individuals may have their communications exclusively based on the topic of search engines. Bill could evaluate his own personal vocabulary and see that John represents his logical connection to this particular subject matter. He could also evaluate other less relevant connections between his colleagues having (in this particular example) a weaker relationship associated with this particular subject matter. Additionally, an administrator (or an end user) can construct specific communities associated with individual subject matter areas. In one example, an administrator may see that John and Bill are actively involved in the area of search engines. Several other end users can also be identified such that the administrator can form a small community that can effectively interact about issues in this subject area.

In another example, entire groups can be evaluated in order to identify common subject matter areas. For example, one group of end users may be part of a particular business segment of a corporate entity. This first group may be associated with switching technologies, whereas a second group within the corporate entity may be part of a second business segment involving traffic management. By evaluating the vocabulary exchanged between these two groups, a common area of interest can be identified. In this particular example, the personal vocabulary being exchanged between the groups reveals a common interest in the subject of deep packet inspection.

Note that one use of the resulting data is to create a dynamic file for each individual user that is tracked, or otherwise identified through communication system 10. Other applications can involve identifying certain experts (or group of experts) in a given area. Other uses could involve building categories or subject matter areas for a given corporate entity. Note also that communication system 10 could accomplish the applications outlined herein in real time. Further, the association of the end users to particular subject matter areas can then be sent to networking sites, which could maintain individual profiles for a given group of end users. This could involve platforms such as Facebook, LinkedIn, etc. The dynamic profile can be supported by the content identification operations associated with the tendered architecture. In other applications, video, audio, and various multimedia files can be tagged by communication system 10 and associated with particular subject areas, or specific end user groups. In one instance, both the end user and the video file (or the audio file) can be identified and logically bound together or linked.

Software for providing both the intelligent vocabulary building and augmented data (including the identification of the active speaker) can be provided at various locations. In one example implementation, this software is resident in a network element, such as central engine 40 and/or network sensor 54, or in another network element for which this capability is relegated. In other examples, this could involve combining central engine 40 and/or network sensor 54 with an application server or a gateway, or a firewall, or some proprietary element, which could be provided in (or be proximate to) these identified network elements, or this could be provided in any other device being used in a given network. In one specific instance, central engine 40 provides the augmented data and/or personal vocabulary building features explained herein, while network sensor 54 can be configured to offer the phoneme-based speech recognition activities detailed herein. In such an implementation, network sensor 54 can initially receive the data, employ its media tagging functions, and then send the results to a text extraction mechanism, which can develop or otherwise process this information.

In other embodiments, all these features may be provided externally to network sensor 54, and/or central engine 40, or included in some other network device, or in a computer to achieve these intended functionalities. As identified previously, a network element can include software to achieve the augmented data and vocabulary building operations, as outlined herein in this document. In certain example implementations, the augmented data and vocabulary building functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the vocabulary building and augmented data operations, as outlined herein. Additionally, each of these devices may include a processor that can execute software or an algorithm to perform the augmented data and vocabulary building activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1A (and its teachings) are readily scalable. Communication system 10 can accommodate a large number of components, as well as more complicated or sophisticated arrangements and configurations. Additionally, although Telepresence and WebEx architectures have been discussed herein, these are just examples of all the many video and/or audio platforms that could benefit from the teachings of the present disclosure. All such possibilities are clearly within the broad scope of the present disclosure. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

What is claimed is:

1. A method, comprising:
    Identifying, by a media engine, a particular word recited by an active speaker in a conference involving a plurality of endpoints in a network environment;
    evaluating, by the media engine, a profile associated with the active speaker in order to identify contextual information associated with the particular word;
    determining, by the media engine, augmented data associated with the particular word based on the contextual information identified from the profile associated with the active speaker;
    providing, by the media engine, the augmented data associated with the particular word to at least some of the plurality of endpoints.

2. The method of claim 1, wherein the active speaker is identified using a facial detection protocol, or a speech recognition protocol.

3. The method of claim 1, wherein audio data from the active speaker is converted from speech to text.

4. The method of claim 1, wherein information in the profile is used to provide personal data about the active speaker to the plurality of endpoints.

5. The method of claim 1, wherein the augmented data is provided on a display of a video conference.

6. The method of claim 1, wherein the augmented data is provided as a message in a chat forum of an audio conference.

7. The method of claim 1, wherein the augmented data is provided as audio data delivered to at least some of the endpoints on particular end-user devices.

8. The method of claim 1, wherein profiles associated with the plurality of endpoints are evaluated in order to adjust the augmented data to be provided to each of the endpoints.

9. Logic encoded in non-transitory media that includes code for execution and when executed by a processor is operable to perform operations comprising:
    identifying a particular word recited by an active speaker in a conference involving a plurality of endpoints in a network environment;
    evaluating a profile associated with the active speaker in order to identify contextual information associated with the particular word;
    determining augmented data associated with the particular word based on the contextual information identified from the profile associated with the active speaker;
    providing augmented data associated with the particular word to at least some of the plurality of endpoints.

10. The logic of claim 9, wherein the active speaker is identified using a facial detection protocol, or a speech recognition protocol.

11. The logic of claim 9, wherein audio data from the active speaker is converted from speech to text.

12. The logic of claim 9, wherein information in the profile is used to provide personal data about the active speaker to the plurality of endpoints.

13. The logic of claim 9, wherein the augmented data is provided on a display of a video conference.

14. The logic of claim 9, wherein the augmented data is provided as a message in a chat forum of an audio conference.

15. The logic of claim 9, wherein the augmented data is provided as audio data delivered to at least some of the endpoints on particular end-user devices.

16. An apparatus, comprising:
    a memory element configured to store data;
    a processor operable to execute instructions associated with the data;

a media engine configured to interface with the memory element and the processor such that the apparatus is configured for:

identifying a particular word recited by an active speaker in a conference involving a plurality of endpoints in a network environment;

evaluating a profile associated with the active speaker in order to identify contextual information associated with the particular word;

determining augmented data associated with the particular word based on the contextual information identified from the profile associated with the active speaker; and providing augmented data associated with the particular word to at least some of the plurality of endpoints.

17. The apparatus of claim 16, wherein the active speaker is identified using a facial detection protocol, or a speech recognition protocol.

18. The apparatus of claim 16, wherein audio data from the active speaker is converted from speech to text.

19. The apparatus of claim 16, wherein information in the profile is used to provide personal data about the active speaker to the plurality of endpoints.

20. The apparatus of claim 16, wherein profiles associated with the plurality of endpoints are evaluated in order to adjust the augmented data to be provided to each of the endpoints.

* * * * *